(12) United States Patent
Sarwar

(10) Patent No.: US 10,887,289 B2
(45) Date of Patent: Jan. 5, 2021

(54) ENCRYPTION IN OPTICAL TRANSPORT NETWORKS USING MULTIPLE RANDOMLY SELECTED KEYS

(71) Applicant: Fujitsu Limited, Kanagawa (JP)

(72) Inventor: Muhammad Sakhi Sarwar, Bethel, CT (US)

(73) Assignee: Fujitsu Limited, Kawasaki (JP)

( * ) Notice: Subject to any disclaimer, the term of this patent is extended or adjusted under 35 U.S.C. 154(b) by 319 days.

(21) Appl. No.: 16/106,171

(22) Filed: Aug. 21, 2018

(65) Prior Publication Data

US 2020/0067887 A1 Feb. 27, 2020

(51) Int. Cl.
*H04L 29/06* (2006.01)
*H04L 9/08* (2006.01)
*H04L 9/16* (2006.01)

(52) U.S. Cl.
CPC .......... *H04L 63/0428* (2013.01); *H04L 9/085* (2013.01); *H04L 9/0894* (2013.01); *H04L 9/16* (2013.01); *H04L 63/166* (2013.01)

(58) Field of Classification Search
CPC .................................................. H04L 63/0428
See application file for complete search history.

(56) References Cited

U.S. PATENT DOCUMENTS

| | | | |
|---|---|---|---|
| 6,160,651 A | 12/2000 | Chang et al. | |
| 6,985,488 B2 | 1/2006 | Pan et al. | |
| 7,100,020 B1 | 8/2006 | Brightman | |
| 10,469,459 B2 * | 11/2019 | Sarwar | H04L 63/0428 |
| 10,511,629 B2 * | 12/2019 | Sarwar | H04L 9/0841 |
| 2004/0028409 A1 * | 2/2004 | Kim | H04L 63/0272 398/71 |
| 2008/0095150 A1 | 4/2008 | Lee | |
| 2008/0270785 A1 * | 10/2008 | Loprieno | H04L 63/0478 713/150 |
| 2009/0041469 A1 | 2/2009 | Hofnneister et al. | |

(Continued)

OTHER PUBLICATIONS

International Telecommunication Union, "Interfaces for the Optical Transport Network" ITU-T G.709/Y.1331 (Jun. 2016); 244 pages.

(Continued)

*Primary Examiner* — Bradley W Holder
(74) *Attorney, Agent, or Firm* — Baker Botts L.L.P.

(57) ABSTRACT

Systems and methods for encryption in optical transport networks may include generating, at a first transponder, multiple encryption keys, each usable to encrypt a data payload in an OTN frame transmitted from the first transponder to a second transponder and storing the keys locally on the first and second transponders. The first transponder may randomly select one of the keys for encrypting a data payload of a given frame and set overhead encryption bits in a preceding frame indicating that the given frame is encrypted and identifying the randomly selected key. The first transponder may encrypt the data payload of the given frame using the randomly selected key prior to transmission. Based on the overhead bits in the preceding frame, the second transponder may decrypt the data payload of the given frame using the randomly selected key. A new key may be randomly selected for each encrypted frame.

20 Claims, 8 Drawing Sheets

(56) References Cited

U.S. PATENT DOCUMENTS

| | | | |
|---|---|---|---|
| 2009/0262937 A1* | 10/2009 | Hirth | H04L 9/0838 380/256 |
| 2010/0098252 A1 | 4/2010 | Kanter | |
| 2011/0135301 A1 | 6/2011 | Myslinski et al. | |
| 2011/0219438 A1 | 9/2011 | Maino | |
| 2011/0231653 A1 | 9/2011 | Bollay et al. | |
| 2012/0008778 A1 | 1/2012 | Mayer | |
| 2012/0201535 A1 | 8/2012 | Loprieno et al. | |
| 2012/0263475 A1 | 10/2012 | Su | |
| 2012/0266209 A1 | 10/2012 | Gooding et al. | |
| 2014/0348140 A1 | 11/2014 | Atkinson | |
| 2015/0215116 A1 | 7/2015 | Gong | |
| 2016/0149867 A1* | 5/2016 | Lohr | H04L 63/0428 380/256 |
| 2016/0301669 A1 | 10/2016 | Muma | |
| 2016/0344507 A1 | 11/2016 | Marquardt et al. | |
| 2017/0099354 A1 | 4/2017 | Moynihan et al. | |
| 2017/0126458 A1 | 5/2017 | Shattil | |
| 2017/0171163 A1 | 6/2017 | Gareau et al. | |
| 2017/0262567 A1 | 9/2017 | Vassiliev | |
| 2018/0294958 A1* | 10/2018 | Sarwar | H04L 9/0841 |
| 2018/0295103 A1 | 10/2018 | Sarwar et al. | |
| 2018/0295116 A1 | 10/2018 | Sarwar et al. | |
| 2018/0310078 A1 | 10/2018 | Szymanski | |

OTHER PUBLICATIONS

International Telecommunication Union, "Architecture of Optical Transport Networks" ITU-T G.872 (Jan. 2017); 68 pages.

Notice of Allowance for U.S. Appl. No. 15/482,440, dated Jun. 27, 2019; 10 pages.

* cited by examiner

|   | 1 | 2 | 3 | 4 | 5 | 6 | 7 | 8 | 9 | 10 | 11 | 12 | 13 | 14 | 15 | 16 |
|---|---|---|---|---|---|---|---|---|---|----|----|----|----|----|----|----|
| 1 |   |   |   |   |   |   | IV [7:0] |   |   |   | AAD [47:16] | | | | | |
| 2 | IV [79:64] | | | Tag [55:0] | | | | | | | | | | | | |
| 3 | | | | | | | | IV [63:48] | | | IV [47:8] | | | | | |
| 4 | | | | | | | | | Tag [127:56] | | | | | Status | | |

FIG. 8

800

ENCRYPTION IN OPTICAL TRANSPORT NETWORKS USING MULTIPLE RANDOMLY SELECTED KEYS

BACKGROUND

Field of the Disclosure

The present disclosure relates generally to optical communication networks and, more particularly, to the use of multiple randomly selected encryption keys for encryption in optical transport networks.

Description of the Related Art

Telecommunication, cable television and data communication systems use optical networks to rapidly convey large amounts of information between remote points. In an optical network, information is conveyed in the form of optical signals through optical fibers. Optical fibers may comprise thin strands of glass capable of communicating the signals over long distances. Optical networks often employ modulation schemes to convey information in the optical signals over the optical fibers. Such modulation schemes may include phase-shift keying (PSK), frequency-shift keying (FSK), amplitude-shift keying (ASK), and quadrature amplitude modulation (QAM).

In addition to modulation of data, optical networks may provide encryption of a data payload that is transmitted over an optical path. The encryption of the data payload involves using an encryption key to encrypt and decrypt the data and may be performed using symmetric or asymmetric encryption between nodes in the optical network, such as between a transmitting transponder and a receiving transponder. Typically, a single encryption key is used for encryption/decryption operations, and a compromise of that key can result in a security breach. In order to strengthen encryption operations, some existing systems rely on increasing the key size. This approach typically requires an update to hardware (e.g., to fixed circuitry) or to a field-programmable gate array (FPGA). Some systems rotate between encryption keys, leaving little time to break a key before it is no longer in use. When activating and deactivating encryption over an optical path or during rotation of encryption keys, conventional methods may drop data frames, which is undesirable.

SUMMARY

In one aspect, a method for encryption in an optical transport network (OTN) is disclosed. The method includes provisioning an optical path between a first transponder and a second transponder in the optical transport network, generating, at the first transponder, a first plurality of encryption keys, each usable to encrypt a data payload in one or more OTN frames transmitted from the first transponder to the second transponder, and storing the first plurality of encryption keys locally on the first transponder and on the second transponder, each of the first plurality of encryption keys being stored in association with a respective identifier of the encryption key. The method further includes, at the first transponder, randomly selecting a first one of the first plurality of encryption keys to be used to encrypt a data payload in a first encrypted OTN frame, setting first overhead encryption bits in a final unencrypted OTN frame to be transmitted prior to transmission of the first encrypted OTN frame to indicate that the next OTN frame to be transmitted by the first transponder is an encrypted OTN frame, the overhead encryption bits including an encoding representing the respective identifier of the first randomly selected encryption key, transmitting the final unencrypted OTN frame to the second transponder, the data payload of the final unencrypted OTN frame being unencrypted, and transmitting the first encrypted OTN frame to the second transponder as the next OTN frame subsequent to transmitting the final unencrypted OTN frame, the data payload of the first encrypted OTN frame being encrypted using the first randomly selected encryption key.

In any of the disclosed embodiments, the method may further include, at the first transponder, randomly selecting a second one of the first plurality of encryption keys to be used to encrypt a data payload in a second encrypted OTN frame, setting second overhead encryption bits in a final OTN frame whose data payload is encrypted using the first randomly selected encryption key to indicate that the next OTN frame to be transmitted by the first transponder is an encrypted OTN frame, the second overhead encryption bits including an encoding representing the respective identifier of the second randomly selected encryption key, transmitting the final OTN frame whose data payload is encrypted using the first randomly selected encryption key to the second transponder, and transmitting the second encrypted OTN frame to the second transponder as the next OTN frame, the data payload of the second encrypted OTN frame being encrypted using the second randomly selected encryption key.

In any of the disclosed embodiments, the final OTN frame whose data payload is encrypted using the first randomly selected encryption key may be the first OTN frame.

In any of the disclosed embodiments, the method may further include, at the second transponder, receiving the final unencrypted OTN frame from the first transponder, including the first overhead encryption bits, determining, based on the first overhead encryption bits, that the next OTN frame to be transmitted by the first transponder is an encrypted OTN frame, determining, based on the first overhead encryption bits, the respective identifier of the first randomly selected encryption key, receiving the first encrypted OTN frame from the first transponder, and decrypting the data payload of the first encrypted OTN frame using the first randomly selected encryption key.

In any of the disclosed embodiments, the method may further include, at the second transponder, receiving a final OTN frame whose data payload is encrypted using the first randomly selected encryption key from the first transponder, including second overhead encryption bits, determining, based on the second overhead encryption bits, that the next OTN frame to be transmitted by the first transponder is an encrypted OTN frame, determining, based on the second overhead encryption bits, the respective identifier of a second randomly selected encryption key, receiving the second encrypted OTN frame from the first transponder, and decrypting the data payload of the second encrypted OTN frame using the second randomly selected encryption key.

In any of the disclosed embodiments, the method may further include, at the second transponder, randomly selecting a second one of the first plurality of encryption keys to be used to encrypt a data payload in a second encrypted OTN frame, the second randomly selected encryption key being different from the first randomly selected encryption key, setting second overhead encryption bits in a given OTN frame to be transmitted by the second transponder prior to transmission of the second encrypted OTN frame to indicate that the next OTN frame to be transmitted by the second transponder is an encrypted OTN frame, the overhead encryption bits including an encoding representing the respective identifier of the second randomly selected encryption key, transmitting the given OTN frame to the first transponder, and transmitting the second encrypted OTN frame to the first transponder as the next OTN frame subsequent to transmitting the given OTN frame, the data payload of the second encrypted OTN frame being encrypted using the second randomly selected encryption key.

In any of the disclosed embodiments, the method may further include, prior to generating the first plurality of encryption keys, receiving, at the first transponder, instructions to activate encryption for OTN frames transmitted from the first transponder to the second transponder, and subsequent to receiving the instructions to activate encryption for OTN frames transmitted from the first transponder to the second transponder, receiving, at the first transponder, instructions to cease encrypting OTN frames transmitted from the first transponder to the second transponder. The method may also include, at the first transponder, in response to receiving the instructions to cease encrypting OTN frames, setting second overhead encryption bits in a final OTN frame whose data payload is encrypted using the first randomly selected encryption key to indicate that the next OTN frame to be transmitted by the first transponder is a new unencrypted OTN frame, transmitting the final OTN frame whose data payload is encrypted using the first randomly selected encryption key to the second transponder, and transmitting the new unencrypted OTN frame to the second transponder, the data payload of which is unencrypted.

In any of the disclosed embodiments, the method may further include, determining that a trigger condition for replacing the first plurality of encryption keys with a new plurality of encryption keys has been met, generating, at the first transponder in response to determining that the trigger condition has been met, a second plurality of encryption keys, each usable to encrypt a data payload in one or more OTN frames transmitted from the first transponder to the second transponder, and storing the second plurality of encryption keys locally on the first transponder and on the second transponder, each of the second plurality of encryption keys being stored in association with a respective identifier of the encryption key. The method may also include, at the first transponder, randomly selecting one of the second plurality of encryption keys to be used to encrypt a data payload in a second encrypted OTN frame, setting second overhead encryption bits in a given OTN frame to be transmitted prior to transmission of the second encrypted OTN frame to indicate that the next OTN frame to be transmitted by the first transponder is an encrypted OTN frame, the overhead encryption bits including an encoding representing the respective identifier of the randomly selected one of the second plurality of encryption keys, transmitting the given OTN frame to the second transponder, and transmitting the second encrypted OTN frame to the second transponder as the next OTN frame subsequent to transmitting the given OTN frame, the data payload of the second encrypted OTN frame being encrypted using the randomly selected one of the second plurality of encryption keys.

In any of the disclosed embodiments, the method may further include, prior to generating the first plurality of encryption keys, establishing a communication channel between the first transponder and the second transponder, and using the communication channel, establishing a Transport Layer Security (TLS) connection over the OTN between the first transponder and the second transponder. Generating the first plurality of encryption keys may include using the TLS connection to generate the first plurality of encryption keys and to share the first plurality of encryption keys with the second transponder.

In any of the disclosed embodiments, the method may further include, prior to generating the first plurality of encryption keys, determining, based on input received from a user, the number of keys in the first plurality of keys.

In another aspect, an optical transport network is disclosed. The optical transport network includes a first transponder, a second transponder, and an optical path provisioned between a first port at the first transponder and a second port at the second transponder. The first transponder is configured to generate a first plurality of encryption keys, each usable to encrypt a data payload in one or more OTN frames transmitted from the first transponder to the second transponder and to share the first plurality of encryption keys with the second transponder, to store the first plurality of encryption keys locally on the first transponder, each of the first plurality of encryption keys being stored in association with a respective identifier of the encryption key, to randomly select a first one of the first plurality of encryption keys to be used to encrypt a data payload in a first encrypted OTN frame, to set first overhead encryption bits in a final unencrypted OTN frame to be transmitted prior to transmission of the first encrypted OTN frame to indicate that the next OTN frame to be transmitted by the first transponder is an encrypted OTN frame, the overhead encryption bits including an encoding representing the respective identifier of the first randomly selected encryption key, to transmit the final unencrypted OTN frame to the second transponder, the data payload of the final unencrypted OTN frame being unencrypted, and to transmit the first encrypted OTN frame to the second transponder as the next OTN frame subsequent to transmitting the final unencrypted OTN frame, the data payload of the first encrypted OTN frame being encrypted using the first randomly selected encryption key.

In any of the disclosed embodiments, the first transponder may be further configured to randomly select a second one of the first plurality of encryption keys to be used to encrypt a data payload in a second encrypted OTN frame, to set second overhead encryption bits in a final OTN frame whose data payload is encrypted using the first randomly selected encryption key to indicate that the next OTN frame to be transmitted by the first transponder is an encrypted OTN frame, the second overhead encryption bits including an encoding representing the respective identifier of the second randomly selected encryption key, to transmit the final OTN frame whose data payload is encrypted using the first randomly selected encryption key to the second transponder, and to transmit the second encrypted OTN frame to the second transponder as the next OTN frame, the data payload of the second encrypted OTN frame being encrypted using the second randomly selected encryption key.

In any of the disclosed embodiments, the second transponder may be configured to store the first plurality of encryption keys locally on the second transponder, each of the first plurality of encryption keys being stored in association with a respective identifier of the encryption key, to receive the final unencrypted OTN frame from the first transponder, including the first overhead encryption bits, to determine, based on the first overhead encryption bits, that the next OTN frame to be transmitted by the first transponder is an encrypted OTN frame, to determine, based on the first overhead encryption bits, the respective identifier of the first randomly selected encryption key, to receive the first encrypted OTN frame from the first transponder, and to decrypt the data payload of the first encrypted OTN frame using the first randomly selected encryption key.

In any of the disclosed embodiments, the second transponder may be further configured to receive a final OTN frame whose data payload is encrypted using the first randomly selected encryption key from the first transponder, including second overhead encryption bits, to determine, based on the second overhead encryption bits, that the next OTN frame to be transmitted by the first transponder is an encrypted OTN frame, to determine, based on the second overhead encryption bits, the respective identifier of a second randomly selected encryption key, to receive the second encrypted OTN frame from the first transponder, and to decrypt the data payload of the second encrypted OTN frame using the second randomly selected encryption key.

In any of the disclosed embodiments, the second transponder may be further configured to randomly select a second one of the first plurality of encryption keys to be used to encrypt a data payload in a second encrypted OTN frame, the second randomly selected encryption key being different from the first randomly selected encryption key, to set second overhead encryption bits in a given OTN frame to be transmitted by the second transponder prior to transmission of the second encrypted OTN frame to indicate that the next OTN frame to be transmitted by the second transponder is an encrypted OTN frame, the overhead encryption bits including an encoding representing the respective identifier of the second randomly selected encryption key, to transmit the given OTN frame to the first transponder, and to transmit the second encrypted OTN frame to the first transponder as the next OTN frame subsequent to transmitting the given OTN frame, the data payload of the second encrypted OTN frame being encrypted using the second randomly selected encryption key.

In any of the disclosed embodiments, the first transponder may be further configured to receive, prior to generating the first plurality of encryption keys, instructions to activate encryption for OTN frames transmitted from the first transponder to the second transponder, to receive, subsequent to receiving the instructions to activate encryption for OTN frames transmitted from the first transponder to the second transponder, instructions to cease encrypting OTN frames transmitted from the first transponder to the second transponder, and in response to receiving the instructions to cease encrypting OTN frames, to set second overhead encryption bits in a final OTN frame whose data payload is encrypted using the first randomly selected encryption key to indicate that the next OTN frame to be transmitted by the first transponder is a new unencrypted OTN frame, to transmit the final OTN frame whose data payload is encrypted using the first randomly selected encryption key to the second transponder, and to transmit the new unencrypted OTN frame to the second transponder, the data payload of which is unencrypted.

In any of the disclosed embodiments, the first transponder may be further configured to determine that a trigger condition for replacing the first plurality of encryption keys with a new plurality of encryption keys has been met, to generate, in response to the determination that the trigger condition has been met, a second plurality of encryption keys, each usable to encrypt a data payload in one or more OTN frames transmitted from the first transponder to the second transponder, to store the second plurality of encryption keys locally on the first transponder, each of the second plurality of encryption keys being stored in association with a respective identifier of the encryption key, to randomly select one of the second plurality of encryption keys to be used to encrypt a data payload in a second encrypted OTN frame, to set second overhead encryption bits in a given OTN frame to be transmitted by the first transponder prior to transmission of the second encrypted OTN frame to indicate that the next OTN frame to be transmitted by the first transponder is an encrypted OTN frame, the overhead encryption bits including an encoding representing the respective identifier of the randomly selected one of the second plurality of encryption keys, to transmit the given OTN frame to the second transponder, and to transmit the second encrypted OTN frame to the second transponder as the next OTN frame subsequent to transmitting the given OTN frame, the data payload of the second encrypted OTN frame being encrypted using the randomly selected one of the second plurality of encryption keys.

In any of the disclosed embodiments, the first transponder may be further configured to determine, prior to generating the first plurality of encryption keys and based on input received from a user, the number of keys in the first plurality of keys.

In any of the disclosed embodiments, the optical transport network may further include a communication channel from the first port to the second port over which a Transport Layer Security (TLS) connection is established between the first transponder and the second transponder. Generating the first plurality of encryption keys may include using the TLS connection to generate the first plurality of encryption keys and to share the first plurality of encryption keys with the second transponder.

In any of the disclosed embodiments, the optical transport network may further include a network management system configured to receive, on behalf of the first transponder, user input specifying the number of keys in the first plurality of keys, to provide instructions to the first transponder to activate encryption for OTN frames transmitted from the first transponder to the second transponder, and subsequent to providing the instructions to the first transponder to activate encryption, to provide instructions to the first transponder to cease encrypting OTN frames transmitted from the first transponder to the second transponder.

BRIEF DESCRIPTION OF THE DRAWINGS

For a more complete understanding of the present disclosure and its features and advantages, reference is now made to the following description, taken in conjunction with the accompanying drawings, in which:

FIG. 8 a block diagram of selected elements of an embodiment of OTN frame overhead data.

DESCRIPTION OF THE EMBODIMENT(S)

Figure 1:
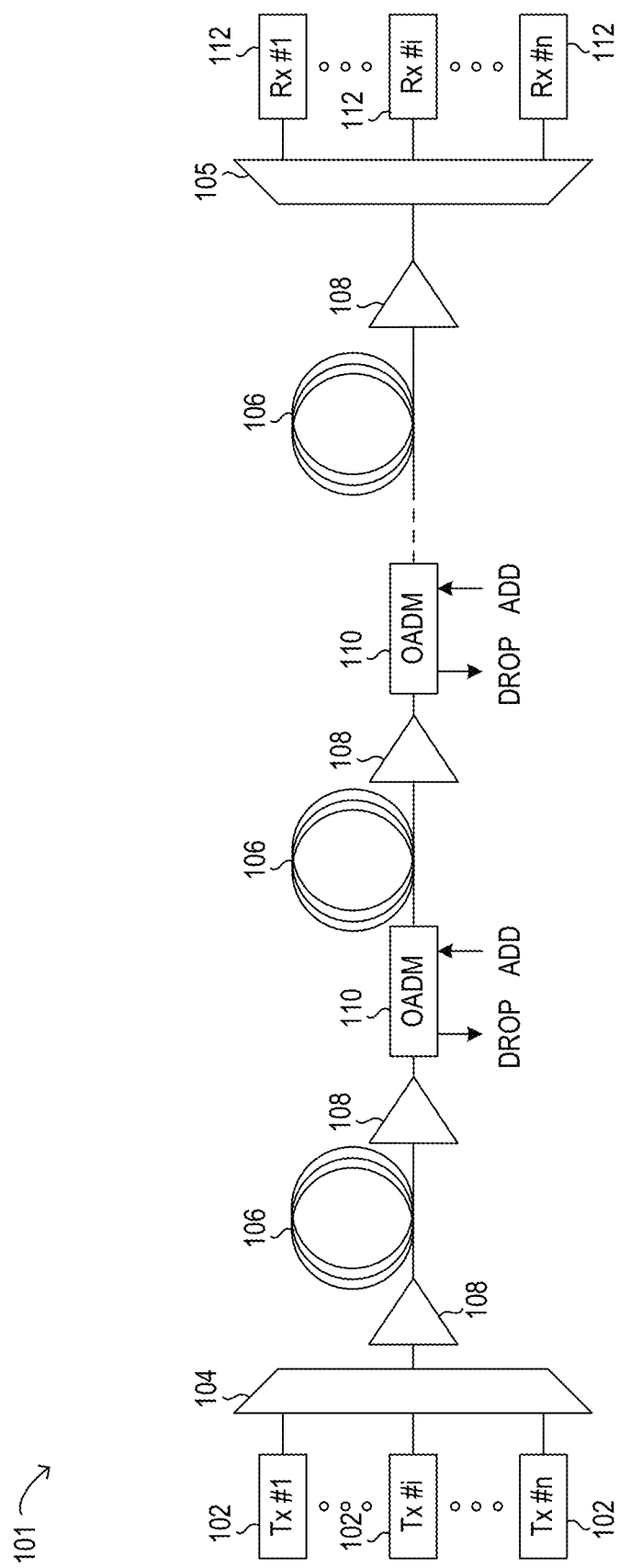
FIG. 1 is a block diagram of selected elements of an embodiment of an optical transport network.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72".

Referring now to the drawings, FIG. 1 illustrates an example embodiment of optical transport network (OTN) 101, which may represent an optical communication system. Optical transport network 101 includes one or more optical fibers 106 to transport one or more optical signals communicated by components of optical transport network 101. The network elements of optical transport network 101, coupled together by fibers 106, may comprise one or more transmitters (Tx) 102, one or more multiplexers (MUX) 104, one or more optical amplifiers 108, one or more optical add/drop multiplexers (OADM) 110, one or more demultiplexers (DEMUX) 105, and one or more receivers (Rx) 112.

Optical transport network 101 may comprise a point-to-point optical network with terminal nodes, a ring optical network, a mesh optical network, or any other suitable optical network or combination of optical networks. Optical transport network 101 may be used in a short-haul metropolitan network, a long-haul inter-city network, or any other suitable network or combination of networks. The capacity of optical transport network 101 may include, for example, 100 Gbit/s, 400 Gbit/s, or 1 Tbit/s. Optical fibers 106 comprise thin strands of glass capable of communicating the signals over long distances with very low loss. Optical fibers 106 may comprise a suitable type of fiber selected from a variety of different fibers for optical transmission. Optical fibers 106 may include any suitable type of fiber, such as a standard Single-Mode Fiber (SMF), Enhanced Large Effective Area Fiber (E-LEAF), or TrueWave® Reduced Slope (TW-RS) fiber.

Optical transport network 101 may include devices to transmit optical signals over optical fibers 106. Information may be transmitted and received through optical transport network 101 by modulation of one or more wavelengths of light to encode the information on the wavelength. In optical networking, a wavelength of light may also be referred to as a "channel" that is included in an optical signal. Each channel may carry a certain amount of information through optical transport network 101.

To increase the information capacity and transport capabilities of optical transport network 101, multiple signals transmitted at multiple channels may be combined into a single wide bandwidth optical signal. The process of communicating information at multiple channels is referred to in optics as wavelength division multiplexing (WDM). Coarse wavelength division multiplexing (CWDM) refers to the multiplexing of wavelengths that are widely spaced having low number of channels, usually greater than 20 nm and less than sixteen wavelengths, and dense wavelength division multiplexing (DWDM) refers to the multiplexing of wavelengths that are closely spaced having large number of channels, usually less than 0.8 nm spacing and greater than forty wavelengths, into a fiber. WDM or other multi-wavelength multiplexing transmission techniques are employed in optical networks to increase the aggregate bandwidth per optical fiber. Without WDM, the bandwidth in optical networks may be limited to the bit-rate of solely one wavelength. With more bandwidth, optical networks are capable of transmitting greater amounts of information. Optical transport network 101 may transmit disparate channels using WDM or some other suitable multi-channel multiplexing technique, and to amplify the multi-channel signal.

Recently, advancements in DWDM enabled combining several optical carriers to create a composite optical signal of a desired capacity. One such example of a multi-carrier optical signal is a superchannel, which is an example of high spectral efficiency (SE) that may attain transmission rates of 100 Gb/s, 400 Gb/s, 1 Tb/s, or higher. Thus, in a superchannel, subcarriers are tightly packed and consume less optical spectrum than in conventional DWDM. Another distinctive feature of superchannels is that the subcarriers in a superchannel travel from the same origin to the same destination, and are not added or removed using an OADM while in transmission. Techniques for achieving high spectral efficiency (SE) in optical networks may include the use of superchannels modulated using dual-polarization quadrature phase-shift keying (DP-QPSK) for long-haul transmission at data rates of 100 Gb/s or greater. In particular embodiments, Nyquist wavelength-division multiplexing (N-WDM) may be used in a superchannel. In N-WDM, optical pulses having a nearly rectangular spectrum are packed together in the frequency domain with a bandwidth approaching the baud rate.

Optical transport network 101 may include one or more optical transmitters (Tx) 102 to transmit optical signals through optical transport network 101 in specific wavelengths or channels. Transmitters 102 may comprise a system, apparatus or device to convert an electrical signal into an optical signal and transmit the optical signal. For example, transmitters 102 may each comprise a laser and a modulator to receive electrical signals and modulate the information contained in the electrical signals onto a beam of light produced by the laser at a particular wavelength, and transmit the beam for carrying the signal throughout optical transport network 101. In some embodiments, optical transmitter 102 may be used to determine the baud rate for the data to be transmitted during the optical modulation. An example of transmitter 102 for applying different baud rates is an adaptive rate transponder. Additionally, a forward error correction (FEC) module may be included in optical transmitter 102, or may be used in conjunction with optical transmitter 102. The FEC module may process the electrical signal carrying the information or data to be transmitted to include error correction codes. The FEC module at transmitter 102 may also determine a baud rate for sending the data to be transmitted to optical transmitter 102 for optical modulation.

Multiplexer 104 may be coupled to transmitters 102 and may be a system, apparatus or device to combine the signals transmitted by transmitters 102, e.g., at respective individual wavelengths, into a WDM signal.

Optical amplifiers 108 may amplify the multi-channeled signals within optical transport network 101. Optical amplifiers 108 may be positioned before and after certain lengths of fiber 106, which is referred to as "in-line amplification".

Optical amplifiers 108 may comprise a system, apparatus, or device to amplify optical signals. For example, optical amplifiers 108 may comprise an optical repeater that amplifies the optical signal. This amplification may be performed with opto-electrical or electro-optical conversion. In some embodiments, optical amplifiers 108 may comprise an optical fiber doped with a rare-earth element to form a doped fiber amplification element. When a signal passes through the fiber, external energy may be applied in the form of a pump signal to excite the atoms of the doped portion of the optical fiber, which increases the intensity of the optical signal. As an example, optical amplifiers 108 may comprise an erbium-doped fiber amplifier (EDFA). However, any other suitable amplifier, such as a semiconductor optical amplifier (SOA), may be used.

OADMs 110 may be coupled to optical transport network 101 via fibers 106. OADMs 110 comprise an add/drop module, which may include a system, apparatus or device to add and drop optical signals (i.e., at individual wavelengths) from fibers 106. After passing through an OADM 110, an optical signal may travel along fibers 106 directly to a destination, or the signal may be passed through one or more additional OADMs 110 and optical amplifiers 108 before reaching a destination. In this manner, OADMs 110 may enable connection of different optical transport network topologies together, such as different rings and different linear spans.

In certain embodiments of optical transport network 101, OADM 110 may represent a reconfigurable OADM (ROADM) that is capable of adding or dropping individual or multiple wavelengths of a WDM signal. The individual or multiple wavelengths may be added or dropped in the optical domain, for example, using a wavelength selective switch (WSS) (not shown) that may be included in a ROADM.

Many existing optical networks are operated at 10 Gbit/s, 40 Gbit/s, 100 Gbit/s or higher signal rates with different channel spacings (e.g., 50 gigahertz (GHz), 75 GHz, or 100 GHz) in accordance with International Telecommunications Union (ITU) standard wavelength grids, also known as fixed-grid spacing, which is compatible with conventional implementations of optical add-drop multiplexers (OADMs) and with conventional implementations of demultiplexers 105. However, as data rates increase to 100 Gbit/s and beyond, the wider spectrum requirements of such higher data rate signals often require increasing channel spacing. In traditional fixed grid networking systems supporting signals of different rates, the entire network system typically must be operated with the coarsest channel spacing (100 GHz, 200 GHz, etc.) that can accommodate the highest rate signals. This may lead to an over-provisioned channel spectrum for lower-rate signals and lower overall spectrum utilization.

Thus, in certain embodiments, optical transport network 101 may employ components compatible with flexible grid optical networking that enables specifying a particular frequency slot per channel. For example, each wavelength channel of a WDM transmission may be allocated using at least one frequency slot. Accordingly, one frequency slot may be assigned to a wavelength channel whose symbol rate is low, while a plurality of frequency slots may be assigned to a wavelength channel whose symbol rate is high. Thus, in optical transport network 101, ROADM 110 may be capable of adding or dropping individual or multiple wavelengths of a WDM, DWDM, or superchannel signal carrying data channels to be added or dropped in the optical domain. In certain embodiments, ROADM 110 may include or be coupled to a wavelength selective switch (WSS).

As shown in FIG. 1, optical transport network 101 may also include one or more demultiplexers 105 at one or more destinations of network 101. Demultiplexer 105 may comprise a system apparatus or device that acts as a demultiplexer by splitting a single composite WDM signal into individual channels at respective wavelengths. For example, optical transport network 101 may transmit and carry a forty (40) channel DWDM signal. Demultiplexer 105 may divide the single, forty channel DWDM signal into forty separate signals according to the forty different channels. It will be understood that different numbers of channels or subcarriers may be transmitted and demultiplexed in optical transport network 101, in various embodiments.

In FIG. 1, optical transport network 101 may also include receivers 112 coupled to demultiplexer 105. Each receiver 112 may receive optical signals transmitted at a particular wavelength or channel, and may process the optical signals to obtain (demodulate) the information (data) that the optical signals contain. Accordingly, network 101 may include at least one receiver 112 for every channel of the network. As shown, receivers 112 may demodulate the optical signals according to a baud rate used by transmitter 102. In some embodiments, receiver 112 may include, or may be followed by, a forward error correction (FEC) module to use the error correction codes to check the integrity of the received data. The FEC module may also correct certain errors in the data based on the error correction codes. The FEC module at receiver 112 may also demodulate the data at a specific baud rate defined for each channel at transmitter 102, as described above.

In various embodiments, transmitters 102 and receivers 112 may be implemented using a so-called "transponder" that can convert between electrical and optical signals (as a transmitter) or between optical and electrical signals (as a receiver). One example of a transponder is a 1FINITY™ T100 Transport (Fujitsu Network Communications, Inc.). Also, in particular embodiments, multiplexer 104 and demultiplexer 105 may be implemented as a ROADM, such as a 1FINITY™ L100 Lambda (Fujitsu Network Communications, Inc.).

Also shown with optical transport network 101 in FIG. 1 is an out-of-band auxiliary network connection 114, which may connect any of transmitters 102 with any of receivers 112. Auxiliary network connection 114 may be implemented using any of a variety of network connections. In some embodiments, auxiliary network connection 114 may be an Ethernet network connection over a private network or a public network, such as the Internet. In other embodiments, auxiliary network connection 114 may be a wireless network connection. In selected embodiments, auxiliary network connection 114 may be another optical or galvanic connection, such as for maintenance or network control purposes (see also network 230 in FIG. 2). In various embodiments, auxiliary network connection 114 may be used for certain communications associated with encryption in optical transport networks using multiple randomly selected encryption keys, as disclosed herein.

Optical networks, such as optical transport network 101 in FIG. 1, may employ modulation techniques to convey information in the optical signals over the optical fibers. Such modulation schemes may include phase-shift keying (PSK), frequency-shift keying (FSK), amplitude-shift keying (ASK), and quadrature amplitude modulation (QAM), among other examples of modulation techniques. In PSK, the information carried by the optical signal may be conveyed by modulating the phase of a reference signal, also known as a carrier wave, or simply, a carrier. The information may be conveyed by modulating the phase of the signal itself using two-level or binary phase-shift keying (BPSK), four-level or quadrature phase-shift keying (QPSK), multi-level phase-shift keying (M-PSK) and differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant.

PSK and QAM signals may be represented using a complex plane with real and imaginary axes on a constellation diagram. The points on the constellation diagram representing symbols carrying information may be positioned with uniform angular spacing around the origin of the diagram. The number of symbols to be modulated using PSK and QAM may be increased and thus increase the information that can be carried. The number of signals may be given in multiples of two. As additional symbols are added, they may be arranged in uniform fashion around the origin. PSK signals may include such an arrangement in a circle on the constellation diagram, meaning that PSK signals have constant power for all symbols. QAM signals may have the same angular arrangement as that of PSK signals, but include different amplitude arrangements. QAM signals may have their symbols arranged around multiple circles, meaning that the QAM signals include different power for different symbols. This arrangement may decrease the risk of noise as the symbols are separated by as much distance as possible. A number of symbols "m" may thus be used and denoted "m-PSK" or "m-QAM."

Examples of PSK and QAM with a different number of symbols can include binary PSK (BPSK or 2-PSK) using two phases at 0° and 180° (or in radians, 0 and $\pi$) on the constellation diagram; or quadrature PSK (QPSK, 4-PSK, or 4-QAM) using four phases at 0°, 90°, 180°, and 270° (or in radians, 0, $\pi/2$, $\pi$, and $3\pi/2$). Phases in such signals may be offset. Each of 2-PSK and 4-PSK signals may be arranged on the constellation diagram. Certain m-PSK signals may also be polarized using techniques such as dual-polarization QPSK (DP-QPSK), wherein separate m-PSK signals are multiplexed by orthogonally polarizing the signals. Also, m-QAM signals may be polarized using techniques such as dual-polarization 16-QAM (DP-16-QAM), wherein separate m-QAM signals are multiplexed by orthogonally polarizing the signals.

Dual polarization technology, which may also be referred to as polarization division multiplexing (PDM), enables achieving a greater bit rate for information transmission. PDM transmission comprises simultaneously modulating information onto various polarization components of an optical signal associated with a channel, thereby nominally increasing the transmission rate by a factor of the number of polarization components. The polarization of an optical signal may refer to the direction of the oscillations of the optical signal. The term "polarization" may generally refer to the path traced out by the tip of the electric field vector at a point in space, which is perpendicular to the propagation direction of the optical signal.

In certain embodiments, optical transport network 101 may transmit a superchannel, in which a plurality of subcarriers (or subchannels or channels) are densely packed in a fixed bandwidth band and may be transmitted at very high data rates, such as 400 Gb/s, 1 Tb/s, or higher. Furthermore, the superchannel may be well suited for transmission over very long distances, such as hundreds of kilometers, for example. A typical superchannel may comprise a set of subcarriers that are frequency multiplexed to form a single channel that are transmitted through optical transport network 101 as one entity. The subcarriers within the superchannel may be tightly packed to achieve high spectral efficiency.

In an optical network, such as optical transport network 101 in FIG. 1, it is typical to refer to a management plane, a control plane, and a transport plane (sometimes called the physical layer). A central management host (see also FIG. 2) may reside in the management plane and may configure and supervise the components of the control plane. The management plane includes ultimate control over all transport plane and control plane entities (e.g., network elements). As an example, the management plane may consist of a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS) which handles one or more network elements from the perspective of the elements, a network management system (NMS) which handles many devices from the perspective of the network, or an operational support system (OSS) which handles network-wide operations.

Modifications, additions or omissions may be made to optical transport network 101 without departing from the scope of the disclosure. For example, optical transport network 101 may include more or fewer elements than those depicted in FIG. 1. Also, as mentioned above, although depicted as a point-to-point network, optical transport network 101 may comprise any suitable network topology for transmitting optical signals such as a ring, a mesh, or a hierarchical network topology.

In operation, optical transport network 101 may employ a digital wrapper technology to encapsulate existing frames of data, which may originate in a variety of native protocols, and may add packetized overhead for addressing, management, and quality assurance purposes. The resulting optical signal, in the form of optical data units (ODUs) may then be transported using individual optical wavelengths by optical transport network 101. The packetized overhead may be used to monitor and control the optical signals being transported using any of a variety of different protocols. In particular embodiments, operation of optical transport network 101 is performed according to optical transport networking (OTN) standards or recommendations promulgated by the International Telecommunications Union (ITU), such as ITU-T G.709—"Interfaces for the Optical Transport Network" and ITU-T G.872—"Architecture of the Optical Transport Network", among others.

In FIG. 1, optical transport network 101 may implement encryption of a data payload transmitted between transmitters 102 and receivers 112. As noted, for example, transmitter 102 and receiver 112 may be implemented using an OTN transponder having similar capabilities that supports bidirectional conversion between optical and electrical signals (see also FIG. 3). The OTN transponder may include some data processing capability, such as a processor having access to memory media storing instructions executable by the processor. In some embodiments, the data processing capability in the OTN transponder may include a digital signal processor (DSP). In various embodiments, the data processing capability in the OTN transponder may be implemented using a field-programmable gate array (FPGA). The data processing capability in the OTN transponder may be used for various operations, such as implementing side-band communication channels, authentication, encryption key generation, encryption key exchange, encryption, de-encryption, and data integrity, among others.

Typically, when encryption is used, a data payload at transmitter 102 is received and may be encrypted before the data payload is packaged into an optical payload unit (OPU) and in an optical data unit (ODU). Note, however, that the data payload may be encrypted at any OTN layer, including the OPU layer, the ODU layer, and/or the optical transport unit (OTU) layer, in different implementations. In some embodiments, a data payload is received as plain text Ethernet packet data. This incoming traffic may be divided into discrete units for encryption and transmission. In one example, the incoming traffic may be divided into discrete plain text units of 128 bits, each of which may be individually encrypted to produce a respective cypher text unit. A plurality of these cypher text units may then be packaged for transmission. For example, an Ethernet frame of 9600 bytes may yield 600 cypher text units. When the OTN frame arrives at receiver 112, the encrypted data payload is unpacked from the transmission packet structure and may be decrypted to yield the original data payload. As noted, transmitter 102 and receiver 112 may comprise the same OTN transponder (see also OTN transponder 300 in FIG. 3) for performing encryption and decryption, among other operations. Although various encryption methods may be used, symmetric encryption is often used with a common encryption key that is shared for both encryption and decryption. Because the common encryption key is fundamental for security using symmetric encryption, secure procedures are used to generate and share the encryption key prior to encrypting the data payload.

The generation and sharing of an encryption key may begin when a user, such as a network administrator, configures an OTN path at optical transport network 101. For example, the user may use any of a variety of secure network connections to connect to both transmitter 102 and receiver 112 to configure the OTN path. Some examples of network protocols and network connections used to configure the OTN path and authenticate the endpoints of the OTN path may include a command line interface (CLI), a simple network management protocol (SNMP), a hypertext transfer protocol with an encrypted connection, such as Secure Socket Layer (SSL) or Transport Layer Security (TLS), and an RSA based protocol (RSA Security LLC, Bedford, Mass., USA). TLS is published by the Internet Engineering Task Force (IETF) and is a secure cryptographic network protocol that is a replacement for Secure Socket Layer (SSL). Configuring the OTN path may include authentication of both receiver 102 and transmitter 112 to the user. Once the OTN path is configured to transmit traffic, the user may then activate encryption for the traffic over optical transport network 101. To implement encryption, a communication channel is established between transmitter 102 and receiver 112. The communication channel may be an in-band channel over optical transport network 101, such as a general communication channel (GCCO). In some embodiments, the communication channel may be an out-of-band channel using auxiliary network connection 114, such as an Ethernet network connection between transmitter 102 and receiver 112. For example, transmitter 102 may attempt to establish the communication channel with receiver 112 using TLS.

To establish the communication channel and set up the TLS connection, various methods or algorithms may be used for key generation and sharing. In an initial step, a pre-shared key (PSK) protocol may be used to establish the communication channel, using a PSK that is shared in advance between transmitter 102 and receiver 112. For example, the PSK may be an authentication key comprising a password that is provided to transmitter 102 and receiver 112. Then, an encryption key may be generated and shared using the communication channel and a key exchange protocol, such as a Diffie-Hellman algorithm for symmetric encryption, for example. Other key exchange protocols for symmetric encryption may be used in various embodiments. Specific variations of the Diffie-Hellman algorithm may also include elliptic curve Diffie-Hellman (ECDH) and ECDH ephemeral (ECDHE). In given embodiments, an encryption key generated by the TLS connection may conform to an Advanced Encryption Standard (AES)-256 for 256-bit encryption keys. Additionally, the TLS connection over the communication channel may employ a data integrity protocol, such as a secure hash algorithm (SHA) designed by the U.S. National Security Agency (NSA) to ensure that no data errors occur over the TLS connection. In various embodiments, the secure hash algorithm may be a SHA-1 or a SHA-2 algorithm designed by NSA.

Once the TLS connection is established, it would be possible to use the TLS connection for encryption of the data payload using an encryption key generated as described above. However, the performance of TLS may be inadequate for the line rates used in OTN and TLS may be undesirable for this reason. In typical implementations, the TLS connection uses the encryption key generation and sharing scheme between transmitter 102 and receiver 112 to generate a second encryption key, and then uses the second encryption key for encryption of the data payload.

As described herein, methods and systems are disclosed for encryption in optical transport networks using multiple randomly selected encryption keys. The methods and systems may use OTN overhead data to signal various encryption control parameters. In some embodiments, each network element may store a set of N (e.g., 8, 16, or 32) encryption keys that are exchanged with each other, e.g., through an in-band or out-of-band communication channel. One of the N keys may be randomly selected to encrypt a particular OTN frame. Key information, such as an index value identifying the randomly selected key and/or a key/frame association, may be included in the overhead data of a previously transmitted OTN frame to inform the receiving network element of the encryption key needed to decrypt the OTN frame.

In some embodiments, the encryption keys may be generated using a simplified encryption key generation. For example, multiple encryption keys may be generated and shared using a TLS connection to encrypt data payloads at line rates over the OTN path. For example, transmitter 102 may be a party to the TLS connection and may store multiple encryption keys generated and shared using TLS, which are then accessible to the processor in transmitter 102. Subsequently, transmitter 102 may use randomly selected ones of the encryption keys to encrypt the data payloads of respective OTN frames, without using the TLS connection. In this manner, a secure key generation and sharing protocol is used, while the actual encryption of the data payload may be performed using a more efficient method, such as a Galois/counter mode (GCM) encryption algorithm, which is particularly desirable at the high line rates used in optical transport network 101. In this manner, the methods and systems for encryption in optical networks disclosed herein may provide improvements over conventional methods.

In some embodiments, the methods and systems for encryption in optical networks disclosed herein may be useful for generating and sharing an encryption key in resource constrained networks, where computational capacity and network bandwidth are limited, providing improved security over existing encryption techniques with very little, if any, additional hardware support needed and without increasing latency or power consumption. In such constrained scenarios, multiple encryption keys may be extracted from a much larger key that is created as part of a key exchange. In one example, a key exchange protocol (e.g., a Diffie-Hellman protocol) may be run once yielding a "master" key that is much larger than what is needed for encryption of the data payloads of individual OTN frames (e.g., 2048 bits) and multiple smaller encryption keys (e.g., keys having 256 bits each) may be extracted from the master key using a pre-determined mathematical function or operation to populate a pool of keys from which individual keys can subsequently be randomly selected for encrypting the data payloads of particular OTN frames.

Additionally, as described in further detail herein, encryption control in optical networks may involve the use of optical transport network overhead data for encryption, and may further comprise a communication protocol to activate or deactivate encryption of the data payload in OTN frames transmitted from transmitter 102 to receiver 112. The methods and systems for use of optical transport network overhead data for encryption may enable activation or deactivation of encryption with a seamless transition between a last unencrypted OTN frame to a first encrypted OTN frame, without dropping or loss of any OTN frames. The methods and systems for use of optical transport network overhead data for encryption may further enable the seamless transition for key rotation, in which a first encryption key is replaced with a second encryption key without dropping or loss of any OTN frames. The methods and systems for use of optical transport network overhead data for encryption may use OTN overhead data to store signal bits used in the communication protocol to control encryption.

Specifically, overhead encryption bits in an overhead portion of the OTN frames may be used for encryption signaling to ensure that no OTN frames are dropped or lost during certain transitions, such as between activating and deactivating encryption of the data payload, or transitioning from using a first randomly selected encryption key to using a second randomly selected encryption key. In one example embodiment, the overhead encryption bits may include:
 a set_encryption bit indicative of whether the data payload is encrypted or unencrypted;
 a deprovision_encryption bit indicative of deprovisioning of encrypting the data payload; and
 a plurality of encryption key bits selected_key that collectively identify an encryption key randomly selected from a pool of encryption keys that have been generated, shared and stored locally on a pair of transponders functioning as transmitter 102 and receiver 112

For example, the overhead encryption bits may be sent in an overhead portion of each OTN frame. In some embodiments, a bidirectional optical path may be established between transmitter 102 and receiver 112 (e.g. when OTN transponders are used), such that OTN frames are continuously sent and received in each direction once the OTN optical path is provisioned, regardless of whether actual data traffic in the form of a data payload in each OTN frame is transmitted. Thus, the overhead encryption bits may be used for bidirectional signaling between transmitter 102 and receiver 112 to prevent dropped or lost OTN frames, as described herein. It is noted that in some embodiments, auxiliary network connection 114 may be used for communication, such as from receiver 112 to transmitter 102, for example, when the OTN optical path is unidirectional from transmitter 102 to receiver 112. In some embodiments, the overhead encryption bits might not be encrypted when transmitted along with a data payload, even if the data payload itself is encrypted. The use of the overhead encryption bits for signaling between transmitter 102 and receiver 112 is described in further detail with respect to FIGS. 4 through 8.

Figure 2:
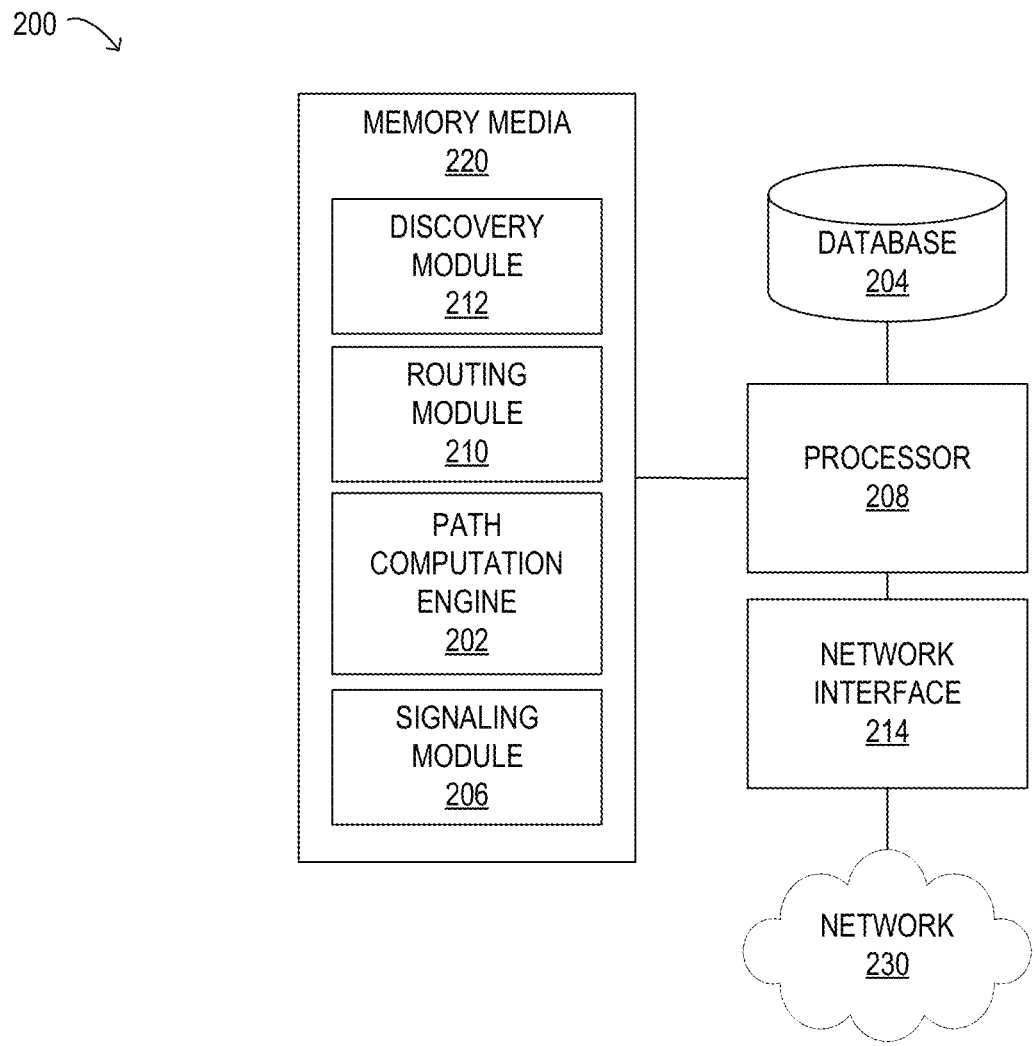
FIG. 2 is a block diagram of selected elements of an embodiment of an optical control plane system.

Referring to FIG. 2, a block diagram of selected elements of an embodiment of a network management system 200 for implementing control plane functionality in optical networks, such as, for example, in optical transport network 101 (see FIG. 1), is illustrated. A control plane may include functionality for network intelligence and control and may comprise applications that support the ability to establish network services, including applications or modules for discovery, routing, path computation, and signaling, as will be described in further detail. In particular, network management system 200 may represent at least certain portions of a network management system used to facilitate encryption in optical transport networks using multiple randomly selected encryption keys, as described herein.

In FIG. 2, the control plane applications executed by network management system 200 may work together to automatically establish services within the optical network. Discovery module 212 may discover local links connecting to neighbors. Routing module 210 may broadcast local link information to optical network nodes while populating database 204. When a request for service from the optical network is received, path computation engine 202 may be called to compute a network path using database 204. This network path may then be provided to signaling module 206 to establish the requested service.

As shown in FIG. 2, network management system 200 includes processor 208 and memory media 220, which may store executable instructions (i.e., executable code) that may be executable by processor 208, which has access to memory media 220. Processor 208 may execute instructions that cause network management system 200 to perform the functions and operations described herein. For the purposes of this disclosure, memory media 220 may include non-transitory computer-readable media that stores data and instructions for at least a period of time. Memory media 220 may comprise persistent and volatile media, fixed and removable media, and magnetic and semiconductor media. Memory media 220 may include, without limitation, storage media such as a direct access storage device (e.g., a hard disk drive or floppy disk), a sequential access storage device (e.g., a tape disk drive), compact disk (CD), random access memory (RAM), read-only memory (ROM), CD-ROM, digital versatile disc (DVD), electrically erasable programmable read-only memory (EEPROM), and flash memory, non-transitory media, or various combinations of the foregoing. Memory media 220 is operable to store instructions, data, or both. Memory media 220 as shown includes sets or sequences of instructions that may represent executable computer programs, namely, path computation engine 202, signaling module 206, discovery module 212, and routing module 210.

Also shown included with network management system 200 in FIG. 2 is network interface 214, which may be a suitable system, apparatus, or device operable to serve as an interface between processor 208 and network 230. Network interface 214 may enable network management system 200 to communicate over network 230 using a suitable transmission protocol or standard. In some embodiments, network interface 214 may be communicatively coupled via network 230 to a network storage resource. In some embodiments, network 230 represents at least certain portions of optical transport network 101. Network 230 may also include certain portions of a network using galvanic or electronic media. In certain embodiments, network 230 may include at least certain portions of a public network, such as the Internet. Network 230 may be implemented using hardware, software, or various combinations thereof.

In certain embodiments, network management system 200 may be configured to interface with a person (a user) and receive data about the optical signal transmission path. For example, network management system 200 may also include or may be coupled to one or more input devices and output devices to facilitate receiving data about the optical signal transmission path from the user and to output results to the user. The one or more input or output devices (not shown) may include, but are not limited to, a keyboard, a mouse, a touchpad, a microphone, a display, a touchscreen display, an audio speaker, or the like. Alternately or additionally, network management system 200 may be configured to receive data about the optical signal transmission path from a device such as another computing device or a network node, for example via network 230. In various embodiments, network management system 200 may be configured to receive inputs from, or on behalf of, users (such as a network administrator) specifying a number of encryption keys to be generated and stored as a pool of keys from which particular keys may be randomly selected, a number of encrypted OTN frames whose data payloads are to be encrypted using a particular encryption key before selecting a new key, a number of encrypted OTN frames whose data payloads are to be encrypted using encryption keys from a particular pool of keys before generating a new pool of encryption keys, the activation or deactivation of encryption for a particular optical path, or other configurable parameters of the encryption process or the control thereof.

As shown in FIG. 2, in some embodiments, discovery module 212 may be configured to receive data concerning an optical signal transmission path in an optical network and may be responsible for discovery of neighbors and links between neighbors. In other words, discovery module 212 may send discovery messages according to a discovery protocol, and may receive data about the optical signal transmission path. In some embodiments, discovery module 212 may determine features, such as, but not limited to: fiber type, fiber length, number and type of components, data rate, modulation format of the data, input power of the optical signal, number of signal carrying wavelengths (i.e., channels), channel spacing, traffic demand, and network topology, among others.

As shown in FIG. 2, routing module 210 may be responsible for propagating link connectivity information to various nodes within an optical network, such as optical transport network 101. In particular embodiments, routing module 210 may populate database 204 with resource information to support traffic engineering, which may include link bandwidth availability. Accordingly, database 204 may be populated by routing module 210 with information usable to determine a network topology of an optical network.

Path computation engine 202 may be configured to use the information provided by routing module 210 to database 204 to determine transmission characteristics of the optical signal transmission path. The transmission characteristics of the optical signal transmission path may provide insight on how transmission degradation factors, such as chromatic dispersion (CD), nonlinear (NL) effects, polarization effects, such as polarization mode dispersion (PMD) and polarization dependent loss (PDL), and amplified spontaneous emission (ASE), among others, may affect optical signals within the optical signal transmission path. To determine the transmission characteristics of the optical signal transmission path, path computation engine 202 may consider the interplay between the transmission degradation factors. In various embodiments, path computation engine 202 may generate values for specific transmission degradation factors. Path computation engine 202 may further store data describing the optical signal transmission path in database 204.

In FIG. 2, signaling module 206 may provide functionality associated with setting up, modifying, and tearing down end-to-end networks services in an optical network, such as optical transport network 101. For example, when an ingress node in the optical network receives a service request, network management system 200 may employ signaling module 206 to request a network path from path computation engine 202 that may be optimized according to different criteria, such as bandwidth, cost, etc. When the desired network path is identified, signaling module 206 may then communicate with respective nodes along the network path to establish the requested network services. In different embodiments, signaling module 206 may employ a signaling protocol to propagate subsequent communication to and from nodes along the network path.

In operation, at least one the modules of network management system 200 may be used to implement encryption in optical transport networks using multiple randomly selected encryption keys, as described herein. For example, signaling module 206 may be used to enable the user to establish network services, including encryption of the data payload over the desired network path. For example, signaling module 206 may enable the user to communicate with transmitter 102 and receiver 112 for the desired network path. Additionally, signaling module 206 may transmit data indicative of operation of transmitter 102 and receiver 112, such as information indicative of encryption performance or data integrity. In some embodiments, signaling module 206 is used to send instructions to transmitter 102 and receiver 112, such as provisioning instructions or encryption instructions.

Figure 3:
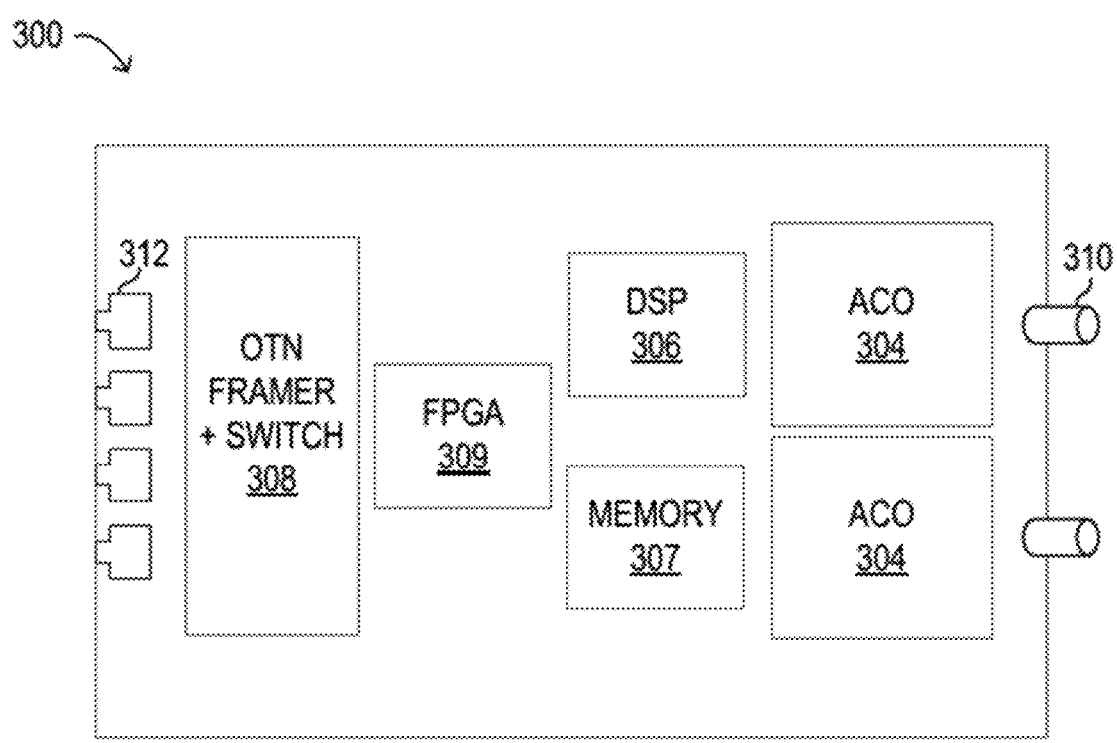
FIG. 3 is a block diagram of selected elements of an embodiment of an OTN transponder.

Referring now to FIG. 3, a block diagram of selected elements of an embodiment of an OTN transponder 300 is illustrated. FIG. 3 is a schematic illustration. OTN transponder 300 may represent various types of optical transceivers, such as transmitter 102 and receiver 112, in various embodiments. OTN transponder 300 may function as a transceiver, with OTN ports 310 (shown as cylindrical ports) being respectively converted between ODUs and Ethernet packets transmitted by Ethernet ports 312. In the exemplary embodiment shown in FIG. 3, OTN transponder 300 is implemented with two analog coherent optical (ACO) transceivers 304, for example, that may support 100G or 200G OTN lines, while Ethernet ports 312 may support 100G Ethernet. It is noted that OTN transponder 300 may be dimensioned for various data throughput rates and may be compatible with different types of optical and copper wire based connectors and receptacles. Although not depicted in FIG. 3, OTN transponder 300 may accordingly include various connector ports for optical or copper wire based connections.

As shown in FIG. 3, OTN transponder includes an FPGA 309 that may be configured to provide processing functionality associated with operation of transmitter 102 and receiver 112. For example, FPGA 309 may be enabled for at least certain processing and logical aspects for encryption in optical transport networks using multiple randomly selected encryption keys, as disclosed herein. OTN transponder 300 may further include a digital signal processor (DSP) 306 having access to a memory 307, which may store executable instructions (i.e., executable code) that may be executable by DSP 306. In various embodiments, DSP 306 may operate to support or augment the processing, computational, and logic capability of FPGA 309. DSP 306 may execute instructions that cause OTN transponder 300 to perform various signal processing operations, general processing operations, computations, and logic operations. For example, DSP 306 may implement a pseudo random number generator (PRNG) in some embodiments. In selected embodiments, FPGA 309 may be used without DSP 306 or memory 307. In selected embodiments, DSP 306 and memory 307 may be used without FPGA 309. It is further noted that FPGA 309 may internally include an FPGA memory (not shown) that may be used to store data, such as an encryption key, among other information, such as information associated with encrypting a data payload transmitted through OTN transponder 300. For the purposes of this disclosure, memory 307 may include non-transitory computer-readable media that stores data and instructions for at least a period of time. Memory 307 may comprise persistent and volatile media, fixed and removable media, and magnetic and semiconductor media. Memory 307 may include, without limitation, storage media such as a direct access storage device (e.g., a hard disk drive or floppy disk), a sequential access storage device (e.g., a tape disk drive), compact disk (CD), random access memory (RAM), read-only memory (ROM), CD-ROM, digital versatile disc (DVD), electrically erasable programmable read-only memory (EEPROM), and flash memory, non-transitory media, or various combinations of the foregoing. Memory 307 is operable to store instructions, data, or both. Also shown included in OTN transponder 300 is an OTN framer+switch 308, which may perform OTN frame processing, such as converting between ODUs and Ethernet frames or vice versa, for example. In addition, OTN framer+switch 308 may perform Ethernet switching among Ethernet ports 312.

In operation, OTN transponder 300 may implement at least certain portions of the use of multiple randomly selected encryption keys for encryption in optical transport networks, as described herein. For example, OTN transponder 300 may implement the TLS connection described above for an OTN path. In some embodiments, the TLS key protocol may be performed multiple times to generate and share multiple encryption keys in a set of encryption keys. The number of encryption keys in the set of keys may be configurable number. For example, it may include 8, 16, or 32 keys, in some embodiments. Subsequently, memory 307 (or FPGA 309) may be used to store the encryption keys from the TLS connection, after which randomly selected ones of the encryption keys may be used for encryption of respective data payloads transmitted by OTN transponder 300. Also, memory 307 (or FPGA 309) may be used to store OTN overhead data, such as overhead encryption bits (see also FIG. 8), that is used to activate or deactivate encryption of the data payload in OTN frames transmitted from transmitter 102 to receiver 112, or for encryption key rotation during encrypted transmission.

In one example, an OTN transponder 300 functioning as transmitter 102 may, using OTN overhead data included in a given OTN frame, signal an OTN transponder 300 functioning as receiver 112 that the next OTN frame will be encrypted and identify the randomly selected encryption key with which the data payload of the next OTN frame will be encrypted. In another example, an OTN transponder 300 functioning as transmitter 102 may, using OTN overhead data included in a given OTN frame, signal an OTN transponder 300 functioning as receiver 112 that the next OTN frame will be unencrypted.

Figure 4:
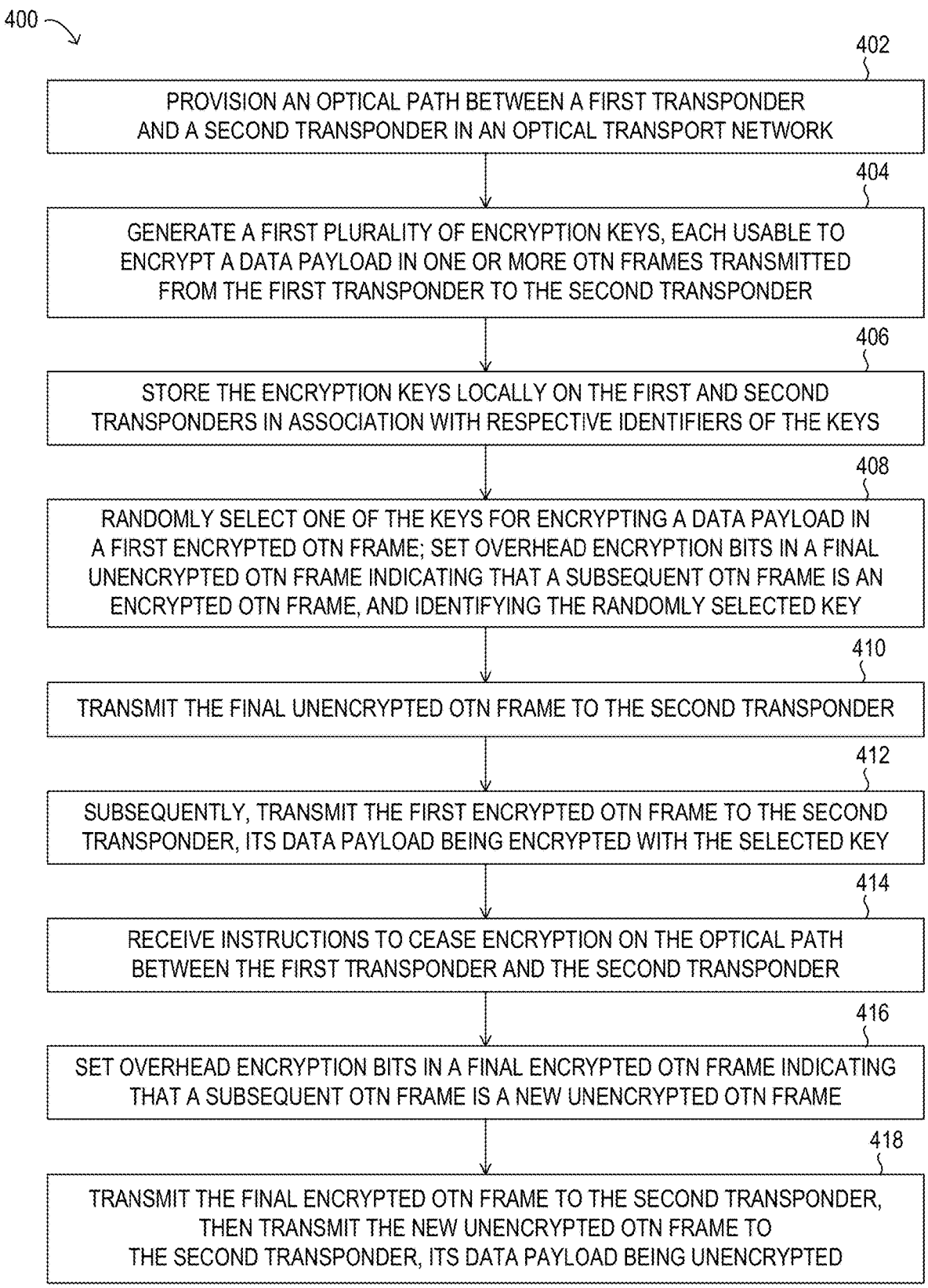
FIG. 4 is a flow chart of selected elements of a method for encryption in optical transport networks using multiple randomly selected encryption keys, according to some embodiments.

Referring now to FIG. 4, a flow chart of selected elements of an embodiment of a method 400 for encryption in optical transport networks using multiple randomly selected encryption keys, including the use of optical transport network overhead data, as described herein, is depicted in flowchart form. Method 400 may be performed using optical transport network 101. In particular embodiments, some or all of the operations of method 400 may be performed by an OTN transponder 300 functioning as transmitter 102, as described above, for an OTN optical path between a first port at transmitter 102 and a second port at receiver 112. It is noted that certain operations described in method 400 may be optional or may be rearranged in different embodiments.

Method 400 may begin at 402 by provisioning an optical path between a first transponder and a second transponder in an optical transport network. In some embodiments, the optical path may be provisioned in response to receiving provisioning instructions for the optical path from a network management system, such as network management system 200. Once the optical path has been provisioned, the first transponder may begin transmitting unencrypted OTN frames over the optical path. For example, the first transponder may transmit one or more OTN frames for which the value of a set_encryption bit has been set to 0. The value set_encryption bit=0 may be indicative of deactivated encryption. It is noted that the logic of bits disclosed herein may be implemented with any desired polarity, in different embodiments.

At step 404, method 400 may include generating a first plurality of encryption keys, each usable to encrypt a data payload in one or more OTN frames transmitted from the first transponder to the second transponder. As described herein, in some embodiments, the plurality of encryption keys may be generated and shared using a TLS key exchange. In some embodiments, the plurality of encryption keys may be generated in response to receiving instructions from network management system 200 to begin encrypting OTN frames.

At 406, the method may include storing the plurality of encryption keys locally on the first transponder and on the second transponder. The encryption keys may be stored in association with respective identifiers of the keys. In some embodiments, the encryption keys may be stored using FPGA 309 or in memory 307 of the OTN transponder 300 functioning as transmitter 102 and using FPGA 309 or in memory 307 of an OTN transponder 300 functioning as receiver 112. In some embodiments, the encryption keys may be stored in an array or in another indexed data structure such that respective index values may be used to identify and retrieve particular ones of the plurality of keys in the set of keys, as needed. For example, each of the plurality of encryption keys may be associated with a respective index value in a range from 1 to N, where N is the number of keys in the generated plurality of encryption keys.

In some embodiments, the number of encryption keys generated and stored may be user configurable. For example, the number of encryption keys generated and stored may be based on user input receive from, or on behalf of, a network administrator. In other embodiments, the number of encryption keys generated and stored may be fixed or may be determined automatically (e.g., by network management system 200 or by processing elements on the first transponder) based on any suitable rules or criteria.

At 408, method 400 may include randomly selecting one of the keys for encrypting a data payload in a first encrypted OTN frame. The method may also include setting overhead encryption bits in a final unencrypted OTN frame to indicate that a subsequent OTN frame is an encrypted OTN frame, and to identify the randomly selected encryption key. Any suitable mechanism may be used to randomly select one of the N encryption keys that have been generated and stored. In some embodiments, the randomly selected encryption key, and/or an identifier thereof, may be stored locally for subsequent use in encrypting the data payload of the encrypted OTN frame. In one example, encryption at the first transponder may be activated by setting the value of the set_encryption bit to 1, setting the value of the deprovision_encryption bit to 0, setting the selected_key bits to a value identifying the randomly selected encryption key, and locally storing the randomly selected encryption key (or an identifier thereof). In some embodiments, the randomly selected encryption key and/or its identifier may be stored using FPGA 309 or in memory 307 of the OTN transponder 300 functioning as transmitter 102.

At 410, method 400 may include transmitting the final unencrypted OTN frame to the second transponder. In some embodiments, in the final unencrypted OTN frame, the value of the set_encryption bit may be set to 1, the value of the deprovision_encryption bit may be set to 0, and the selected_key bits may be set to a value identifying the randomly selected encryption key. The final unencrypted OTN frame may be used to signal the second transponder that a subsequent frame will have an encrypted data payload with advance notice in order for the second transponder to become ready to decrypt the first encrypted OTN frame, once it is received, without frame loss. At 412, after transmitting the final encrypted OTN frame, the method may include transmitting the first encrypted OTN frame to the second transponder and the data payload of the first encrypted OTN frame may be encrypted using the randomly selected encryption key. In some embodiments, the first encrypted OTN frame may be the OTN frame that immediately follows the final unencrypted OTN frame. In other embodiments, there may be one or more additional OTN frames and/or other information transmitted from the first transponder to the second transponder between the final unencrypted OTN frame and the first encrypted OTN frame.

At some point, shown as 414, method 400 may include receiving instructions to cease encryption on the optical path between the first transponder and the second transponder. In some embodiments, the instructions may be received from network management system 200. At 416, in response to receiving the instructions to cease encryption, the method may include setting overhead encryption bits in a final encrypted OTN frame indicating that a subsequent OTN frame is a new unencrypted OTN frame. For example, the value of the set_encryption bit may be set to 0 and/or the value of the deprovision_encryption bit may be set to 1.

At 418, the method may include transmitting the final encrypted OTN frame to the second transponder, then transmitting the new encrypted OTN frame to the second transponder, its data payload being unencrypted. In some embodiments, the new unencrypted OTN frame may be the OTN frame that immediately follows the final encrypted OTN frame. In other embodiments, there may be one or more additional OTN frames and/or other information transmitted from the first transponder to the second transponder between the final encrypted OTN frame and the new unencrypted OTN frame.

Figure 5:
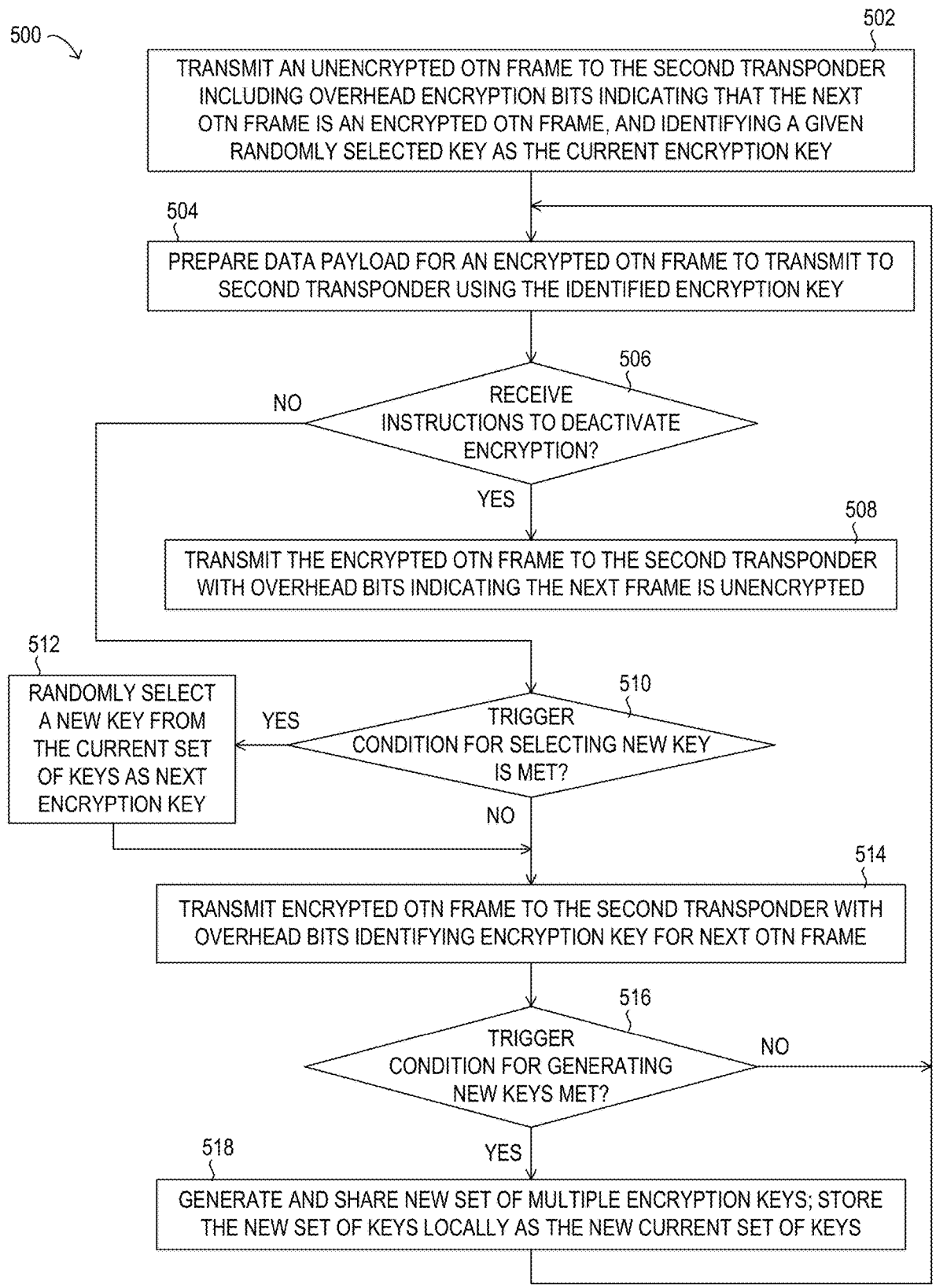
FIG. 5 is a flow chart of selected elements of a method for encryption control in optical networks from the perspective of a transmitting network element, according to some embodiments.

Referring now to FIG. 5, a flow chart of selected elements of an embodiment of a method 500 for encryption control in optical networks from the perspective of a transmitting network element, as described herein, is depicted in flowchart form. Method 500 may be performed using optical transport network 101. In particular embodiments, some or all of the operations of method 500 may be performed by an OTN transponder 300 functioning as transmitter 102, as described above, for an OTN optical path between a first port at transmitter 102 and a second port at receiver 112. It is noted that certain operations described in method 500 may be optional or may be rearranged in different embodiments.

Method 500 may begin at 502 by transmitting an unencrypted OTN frame to the second transponder including overhead encryption bits indicating that the next OTN frame is an encrypted OTN frame, and identifying a given randomly selected encryption key as the current encryption key. In some embodiments, in the final unencrypted OTN frame, the value of the set_encryption bit may be set to 1, the value of the deprovision_encryption bit may be set to 0, and the selected_key bits may be set to a value identifying the randomly selected encryption key. In some embodiments, the identified encryption key may have been randomly selected from a current set of encryption keys generated in response to receiving instructions from a network management system such as network management system 200 to begin encrypting OTN frames. In some embodiments, the identified encryption key may be stored locally as a current encryption key to be used in encrypting the data payload of the next OTN frame. For example, the identified encryption key and/or its identifier may be stored using FPGA 309 or in memory 307 of the OTN transponder 300 functioning as transmitter 102.

At 504, method 500 may include preparing a data payload for an encrypted OTN frame to be transmitted to the second transponder by encrypting the data payload using the identified encryption key.

If, at 506, instructions have been received to deactivate encryption, the method may continue at 508. Otherwise, method 500 may proceed to 510. At 508, the method may include transmitting the encrypted OTN frame to the second transponder including overhead bits indicating that the next OTN frame is unencrypted. Following 508, the method may include transmitting one or more unencrypted OTN frames until and unless subsequent instructions are received to resume encryption (not shown), after which some or all of the operations illustrated in FIG. 5 may be repeated, as appropriate, beginning at 502.

If, at 510, it is determined that a trigger condition for selecting a new encryption key is met, method 500 may continue at 512. Otherwise, method 500 may proceed to 514. In one example embodiment, a respective encryption key may be individually selected from the current set of encryption keys for each encrypted OTN frame. In this example, the trigger condition may be the transmission of the next OTN frame in a series of OTN frames. By using a different randomly selected key for each encrypted OTN frame, the key rotation interval may be substantially equal to the OTN frame interval, which is 1.25 microseconds at a 100 Gbit/s transmission rate, for example. In another example embodiment, a new encryption key may be selected from the current set of encryption keys after the current key has been used to encrypt the data payloads of a predetermined number of encrypted OTN frames other than one. In this example, the trigger condition may be a counter whose value reflects the number of encrypted OTN frames for which the data payload is encrypted using the current encryption key reaching the predefined value. In still other embodiments, the trigger condition may include the expiration of a timer, an explicit request made by a user (such as a network administrator) to select a new key, or receipt of an instruction (e.g., from network management system 200) to select a new key based on other rules or criteria.

At 512, method 500 may include randomly selecting a new key from the current set of encryption keys as the next encryption key. This newly selected key may be used to encrypt the data payloads of subsequently received encrypted OTN frames until and unless another new key is randomly selected. In some embodiments, the newly selected encryption key may be stored locally to be used in encrypting the data payload of the next OTN frame. For example, the newly selected encryption key and/or its identifier may be stored using FPGA 309 or in memory 307 of the OTN transponder 300 functioning as transmitter 102, replacing the previously stored encryption key. Method 500 may then proceed to 514.

At 514, the method may include transmitting the encrypted OTN frame to the second transponder with overhead bits identifying the encryption key to be used for encoding the data payload of the next encrypted OTN frame. If a new encryption key was randomly selected at 512, the overhead bits may identify the newly selected encryption key. If no new encryption key was randomly selected (shown as the negative exit from 510), the overhead bits may identify the previously selected encryption key (i.e., the encryption key with which the data payload for the encrypted frame being transmitted was encrypted).

If, at 518, it is determined that a trigger condition for generating a new set of encryption keys is met, method 500 may continue to 518. Otherwise, method 500 may return to 504. In one example embodiment, a new set of encryption keys may be generated for each encrypted OTN frame. In this example, the trigger condition may be the transmission of the next OTN frame in a series of OTN frames. In another example embodiment, a new set of encryption keys may be generated after keys in the current set of encryption keys have been used to encrypt the data payloads of a predetermined number of encrypted OTN frames other than one. In this example, the trigger condition may be a counter whose value reflects the number of encrypted OTN frames for which the data payload is encrypted using keys in the current set of encryption keys reaching the predefined value. In still other embodiments, the trigger condition may include the expiration of a timer, an explicit request made by a user (such as a network administrator) to select a new key, or receipt of an instruction (e.g., from network management system 200) to select a new key based on other rules or criteria. In some embodiments, a network administrator or network management system 200 may initiate the generation of a new set of encryption keys in response to detecting suspicious activity that might be indicative of a security breach, such as in response to detecting one or more transmission errors. For example, as each encrypted OTN frame is received, and prior to decrypting its data payload, various integrity checks or other authentication processes may be applied to the OTN frame. If any of these authentication processes fail, the OTN frame may be dropped and the network administrator or network management system 200 may initiate the generation of a new set of encryption keys to restart the encryption process for the optical path.

At 518, method 500 may include generating and sharing a new set of multiple encryption keys and storing the new set of encryption keys locally as the new current set of keys, after which method 500 may return to 512. Any or all of the operations shown in FIG. 5 may be repeated, as appropriate, as OTN frames are received for transmission from the first transponder to the second transponder during operation of the optical path.

Figure 6:
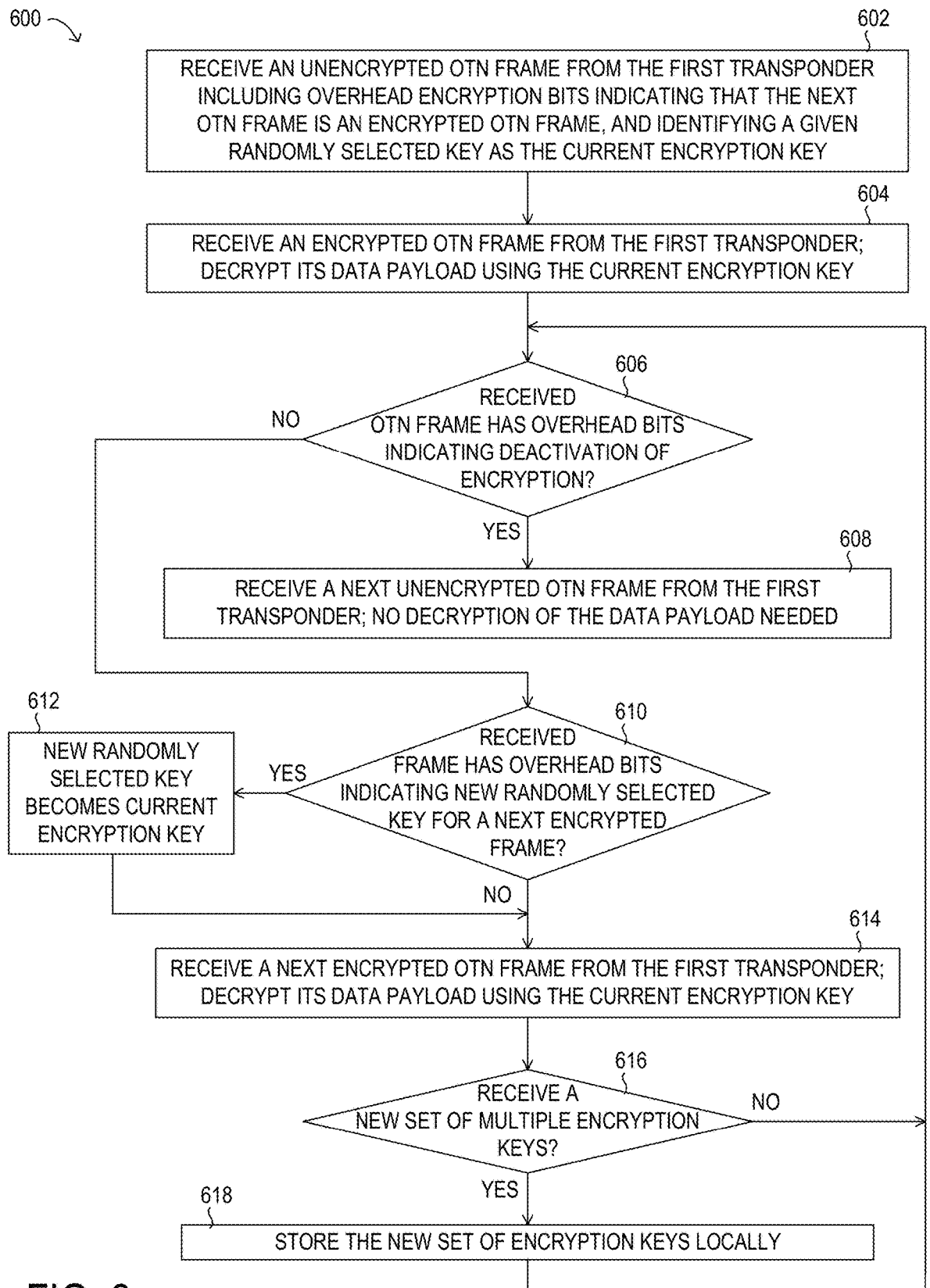
FIG. 6 is a flow chart of selected elements of a method for encryption control in optical networks from the perspective of a receiving network element, according to some embodiments.

Referring now to FIG. 6, a flow chart of selected elements of an embodiment of a method 600 for encryption control in optical networks from the perspective of a receiving network element, as described herein, is depicted in flowchart form. Method 600 may be performed using optical transport network 101. In particular embodiments, method 600 may be executed by an OTN transponder 300 functioning as receiver 112, as described above, for an OTN optical path between a first port at transmitter 102 and a second port at receiver 112. In some embodiments, method 600 may be performed following the performance, by a transmitting network element, of the operation shown as 410 in method 400. For example, it may be assumed that, prior to the execution of method 600, the receiving network element (e.g., an OTN transponder 300 functioning as receiver 112) has received and stored a set of encryption keys and has been configured to receive unencrypted OTN frames from a transmitting network element (e.g., an OTN transponder 300 functioning as transmitted 102). It is noted that certain operations described in method 600 may be optional or may be rearranged in different embodiments.

Method 600 may begin, at 602, by receiving an unencrypted OTN frame from the first transponder including overhead encryption bits indicating that the next OTN frame is an encrypted OTN frame, and identifying a given randomly selected encryption key as the current encryption key. In some embodiments, in the received unencrypted OTN frame, the value of the set_encryption bit may be set to 1, the value of the deprovision_encryption bit may be set to 0, and the selected_key bits may be set to a value identifying the randomly selected encryption key. In some embodiments, the randomly selected encryption key and/or its identifier may be stored using FPGA 309 or in memory 307 of the OTN transponder 300 functioning as receiver 112 for use in decrypting the data payload of the next OTN frame.

At 604, method 600 may include receiving an encrypted OTN frame from the first transponder and decrypting its data payload using the current encryption key.

If, at 606, it is determined that the received OTN frame includes overhead bits indicating the deactivation of encryption, method 600 may continue to 608. For example, the value of the set_encryption bit may be set to 0 and/or the value of the deprovision_encryption bit may be set to 1. Otherwise, method 600 may proceed to 610.

At 608, the method may include receiving a next unencrypted OTN frame from the first transponder, and refraining from descripting its data payload, as no decryption of the data payload is needed. Following 608, the method may include continuing to receive unencrypted OTN frames, and refraining from decrypting them (not shown), until and unless a subsequent unencrypted OTN frame is received that includes overhead bits indicating that the next OTN frame is an encrypted OTN frame and identifying a first randomly selected encryption key as the current encryption key, as in

602. At that point, some or all of the operations shown as 604-618 may be repeated, as appropriate, during continued operation of the optical path.

If, at 610, it is determined that the received OTN frame includes overhead bits indicating that a new randomly selected encryption key is to be used to decrypt a next encrypted frame, method 600 may continue at 612. For example, the overhead bits may include selected_key bits that are set to a value identifying a different encryption key than the encryption key previously identified (e.g., at 602). Otherwise, method 600 may proceed to 614.

At 612, the method may include the new randomly selected encryption key becoming the current encryption key. In some embodiments, the new randomly selected encryption key and/or its identifier may be stored using FPGA 309 or in memory 307 of the OTN transponder 300 functioning as receiver 112 for use in decrypting the data payload of the next OTN frame, replacing the previously stored encryption key. Method 600 may then continue at 614.

At 614, method 600 may include receiving a next encrypted OTN frame from the first transponder and decrypting its data payload using the current encryption key.

If, at 618, a new set of multiple encryption keys is received (e.g., as a result of a TLS key generation and sharing operation), method 600 may proceed to 618. Otherwise, method 600 may return to 606. At 618, the method may include storing the new set of encryption keys locally, after which method 600 may return to 606.

In the example embodiments illustrated in FIGS. 4, 5 and 6, the overhead encryption bits included in any given OTN frame may signal whether or not the data payload of the next transmitted OTN frame is encrypted and, if so, may identify the randomly selected encryption key with which the data payload of the next transmitted OTN frame will be encrypted. In other embodiments, the overhead encryption bits may include an encoding (e.g., one or more bits) indicating to which subsequently transmitted OTN frame the identified key will be applied. In such embodiments, an encryption key may be randomly selected well ahead of when it will be used to encrypt one or more data payloads at a transmitting network element and the key, or an identifier thereof, may be provided to a receiving network element well ahead of when it will be used to decrypt data payloads received from the transmitting network element.

In one example, the overhead encryption bits in a given OTN frame may include an encoding indicating that the first encrypted OTN frame to which an identified encryption key is applied will be the third OTN frame following the given OTN frame. In this example, the data payloads of any encrypted OTN frames transmitted between the given OTN frame and the third OTN frame following the given OTN frame may be encrypted using the same encryption key as the given OTN frame (if the given OTN frame was an encrypted OTN frame) or using another previously selected encryption key (whether or not the given OTN frame was an encrypted OTN frame). In some embodiments, the distance between a given OTN frame that includes overhead encryption bits identifying a randomly selected encryption key and the first OTN frame to which the identified key is applied may be randomly selected from within a range of distances, such as between a value of one (indicating that the identified key applies to the OTN frame transmitted immediately following the given OTN frame) and a value of ten (indicating that the identified key applied to the tenth OTN frame transmitted subsequent transmission of the given OTN frame).

In some embodiments, the overhead encryption bits included in each OTN frame transmitted between a transmitting network element and a receiving network element may include an encoding (e.g., one bit) indicating whether or not the data payload of the OTN frame itself is encrypted. In some such embodiments, the overhead encryption bits included in a given OTN frame may identify the randomly selected encryption key with which the data payload of the next encrypted OTN frame will be encrypted. For example, a given OTN frame may include an encoding indicating that its data payload is not encrypted, an encoding indicating that the data payload of a subsequent OTN frame is encrypted, and an encoding identifying a randomly selected encryption key with which the data payload of the subsequent OTN frame is to be encrypted. When the given OTN frame is received, the receiving network element may store the identified encryption key and may subsequently apply it to decrypt the data payload of the next OTN frame it receives that includes an encoding indicating its data payload is encrypted.

In some embodiments in which encryption keys are rotated based on a trigger condition being met, an encryption key may be randomly selected well ahead of when it will be used to encrypt one or more data payloads at a transmitting network element and the key, or an identifier thereof, may be provided to a receiving network element well ahead of when it will be used to decrypt data payloads received from the transmitting network element. In some such embodiments, the identified encryption key may subsequently be applied to encrypt the data payloads of one or more OTN frames once the trigger condition is met. For example, the trigger condition may be a counter whose value reflects the number of encrypted OTN frames for which the data payload is encrypted using the current encryption key reaching the predefined value. In other examples, the trigger condition may include the expiration of a timer, an explicit request made by a user (such as a network administrator) to apply the new key, or receipt of an instruction (e.g., from network management system 200) to apply the new key based on other rules or criteria.

In embodiments in which a randomly selected encryption key is to be used to encrypt the data payload of a subsequent OTN frame other than the OTN frame transmitted immediately following the OTN frame in which it is identified, the randomly selected encryption key may be stored locally on the transmitting network element for subsequent use in encrypting one or more data payloads of OTN frames to be transmitted to a receiving network element and/or may be stored locally on the receiving network element, once received, for subsequent use in decrypting one or more data payloads of OTN frames received from the transmitting network element.

In some embodiments, a given OTN transponder functioning, at least some of the time, as a receiver 112 may, at other times, operate to transmit data payloads back to an OTN transponder that, at least some of the time, functions as a transmitter 102, e.g., over a bidirectional optical path. When operating as a transmitter, the given OTN transponder may perform its own random key selection from the set of keys generated by the TLS connection between the two transponders and may select a different key than the one used to encrypt the OTN frames it receives. For example, the given OTN transponder may receive one or more OTN frames whose data payloads were encrypted using a first one of the encryption keys in the set of keys, and may transmit one or more OTN frames whose data payloads are encrypted using a second one of the encryption keys in the same set of keys. In another example, each of the OTN transponders may initiate the generation of its own set of multiple encryption keys, may share its set of keys with the other OTN transponder, and may randomly select respective ones of the keys in its own set of keys when encrypting the data payloads of OTN frames that it transmits over the bidirectional optical path.

Figure 7:
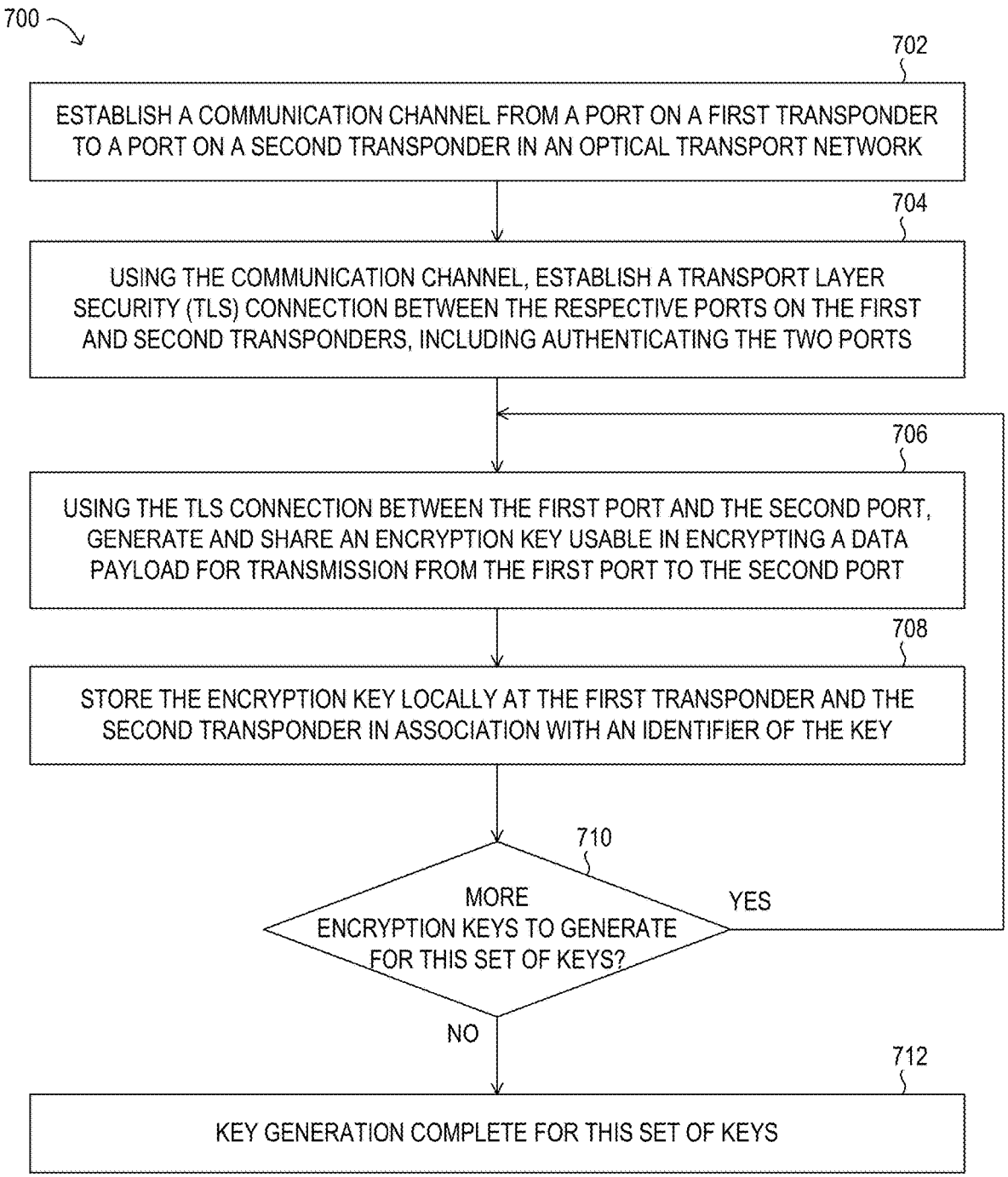
FIG. 7 is a flow chart of selected elements of a method for generation of multiple encryption keys in an optical transport network, according to some embodiments.

As previously described, the TLS key protocol may be executed multiple times to generate and share multiple encryption keys in a set of encryption keys (e.g., 8, 16, or 32 keys). FIG. 7 is a block diagram of selected elements of an embodiment of method 700 for generation of multiple encryption keys in an optical transport network, as described herein, is depicted in flowchart form. Method 700 may be performed using optical transport network 101. In some embodiments, method 700 may be executed by network management system 200 in conjunction with one or more OTN transponders 300 (functioning as transmitter 102 and/or receiver 112), as described above. It is noted that certain operations described in method 700 may be optional or may be rearranged in different embodiments.

Method 700 may begin at 702 when a communication channel is established from a port on a first transponder to a port on a second transponder in an optical transport network. In some embodiments, the communication channel may be an in-band channel over the OTN, such as a GCCO channel. In some embodiments, the communication channel may be an out-of-band channel, such as over an auxiliary network connection between the first port and the second port.

At 704, method 700 may include, using the communication channel, establishing a TLS connection between the first port and the second port, which may include using an authentication key to authenticate the first port and the second port.

At 706, the method may include, using the TLS connection between the first port and the second port, generating and sharing an encryption key usable in encrypting a data payload to be transmitted from the first port to the second port. For example, the TLS connection may generate the encryption key and share it with the first transponder and the second transponder.

At 708, the method may include storing the encryption key locally at the first transponder and at the second transponder in association with an identifier of the key. In some embodiments, the encryption key may be stored using FPGA 309 or in memory 307 of the OTN transponder 300 functioning as transmitter 102 and using FPGA 309 or in memory 307 of an OTN transponder 300 functioning as receiver 112. In some embodiments, the encryption key may be stored in an array or in another indexed data structure such that a respective index value may be used to identify and retrieve the encryption key, as needed.

If, at 710, there are more encryption keys to generate for this set of keys, method 700 may return to 706 one or more times to generate and store additional encryption keys. For example, each of a plurality of encryption keys may be generated and then stored in association with a respective index value in a range from 1 to N, where N is the number of keys in the generated plurality of encryption keys. In some embodiments, the number of encryption keys generated and stored may be user configurable. For example, the number of encryption keys generated and stored may be based on user input receive from, or on behalf of, a network administrator. In other embodiments, the number of encryption keys generated and stored may be fixed or may be determined automatically (e.g., by network management system 200 or by processing elements on the first transponder) based on any suitable rules or criteria.

If, or once, the set of keys includes the specified number of keys, key generation may be complete for this set of keys, as in 712. Subsequently, one or more of the keys in the set of keys may be used to encrypt the data payloads for one or more OTN frames to be transmitted over the optical path from the first port to the second port. In at least some embodiments, the data payloads for the OTN frames may be encrypted using an encryption protocol different from TLS. For example, the TLS connection may not be used for data transmission, each data payload may be encrypted at the transmitter using a randomly selected one of the encryption keys in the set of encryption keys, and the data payload may be decrypted at the receiver using the randomly selected one of the encryption keys in the set of encryption keys.

In some embodiments, when and if a trigger condition for generating a new set of encryption keys is met, some or all of the operations illustrated in FIG. 7 may be repeated to generate a new set of encryption keys. In one example, if the communication channel is still active, only the operations shown as 706-712 may be repeated. However, if the communication channel is not still active, the operations shown as 702 and 704 may also be repeated in order to re-establish a communication channel and a TLS connection between the first and second transponders.

Referring now to FIG. 8, a block diagram of selected elements of an embodiment of an OTN frame 800 including overhead data is illustrated. In the depiction shown in FIG. 8, OTN frame overhead data 800 is shown as a 64-byte header, such as an ODU header, in a 16-column×4-row format. In the ODU, OTN frame overhead data 800 is not collectively encrypted, even when the data payload in the ODU is encrypted. The data payload may consist of 15,232 bytes (or 3,808 columns×4 rows) that are appended to OTN frame overhead data 800. In some embodiments, the ODU may include a forward error correction (FEC) portion that is appended to the data payload and that is also not encrypted.

When encryption is used for the data payload of the ODU, a block cipher may be applied 952 times to each 128-bit portion of the data payload, using an AES-256 encryption key, for example, using a GCM algorithm, as described previously.

In OTN frame overhead data 800, certain data structures for encryption control in optical networks, as described herein, are depicted. Additional authenticated data (AAD) may include certain overhead encryption bits that are used for signaling between transmitters and receivers, as described previously. The overhead encryption bits may include a set_encryption bit indicative of whether the data payload is encrypted or unencrypted, a deprovision_encryption bit indicative of deprovisioning of encrypting the data payload, and multiple encryption key bits, e.g., selected_key bits, collectively identifying an encryption key randomly selected from a plurality of encryption keys, among other signaling bits and flags used. For example, the value of the selected_key bits may, in a particular OTN frame, represent an identifier of one of N keys in a pool of encryption keys to be used to encrypt the data payload of the next OTN frame to be transmitted on a given optical path. The identifier may be an index value corresponding to a location within a data structure residing in local memory on the transmitter and receiver for the given optical path that stores all the keys, the index value identifying a particular one of the stored keys.

In particular embodiments, the overhead encryption bits may be stored using 4 bytes, such as the 4 bytes comprised of bits AAD[47:16], shown in bytes 11 through 14 of OTN frame overhead data 800. An initialization vector (IV) may include a 48-bit counter value that counts OTN frames, or encrypted OTN frames, for different trigger conditions, as described herein. In some embodiments, the 48-bit counter may be reset each time a new encryption key is selected and/or each time a new set of keys is generated. In some embodiments, the 48-bit counter value may be used by receiver 112 to detect when OTN frames are received out of sequence or are dropped. In particular embodiments, the 48-bit counter value may be stored using 6 bytes, such as the 6 bytes comprised of bits IV[47:0], shown in byte 7, and bytes 57 through 61 of OTN frame overhead data 800. Also, a 128-bit tag may be used in OTN frame overhead data 800 for data integrity of the AAD. For example, the AAD and the encryption key may be used to authenticate the 128-bit tag upon receipt of each OTN frame. When the 128-bit is not authenticated, the OTN frame may be dropped. In some embodiments, this condition may trigger the generation of a new set of encryption keys. In particular embodiments, the 128-bit tag may be stored using 16 bytes, such as the 16 bytes comprised of bits Tag[127:0], shown in bytes 21 through 29 and bytes 33 through 39 of OTN frame overhead data 800. Also, byte 62 of OTN frame overhead data 800 may be used as a status byte to indicate various internal conditions, for example, using individual bits or groups of bits.

As disclosed herein, methods and systems may use optical transport network overhead data for encryption. In particular, specific overhead encryption bits and other encryption data may be stored in an OTN header and used for signaling between a first OTN transponder functioning as a transmitter and a second OTN transponder functioning as a receiver for encrypted transmission without lost data frames. The systems and methods may include generating, at a first transponder, multiple encryption keys, each usable to encrypt a data payload in an OTN frame transmitted from the first transponder to a second transponder and storing the keys locally on the first and second transponders. The first transponder may randomly select one of the keys for encrypting a data payload of a given OTN frame and set overhead encryption bits in a preceding OTN frame indicating that the next OTN frame (i.e., the given OTN frame) is encrypted and identifying the randomly selected key. The first transponder may encrypt the data payload of the given OTN frame using the randomly selected key prior to transmission. Based on the overhead bits in the preceding OTN frame, the second transponder may decrypt the data payload of the given OTN frame using the randomly selected key. A new key may be randomly selected for each encrypted OTN frame. The overhead encryption bits may also be set to signal activation and/or deactivation of encryption on an optical path between the first and second transponders. In some embodiments, the generation of multiple encryption keys and the random selection of particular ones of the keys for use in encrypting respective OTN frames may enhance encryption in optical networks over existing techniques with very little additional hardware, and without increasing latency or power consumption.

While the subject of this specification has been described in connection with one or more exemplary embodiments, it is not intended to limit any claims to the particular forms set forth. On the contrary, any claims directed to the present disclosure are intended to cover such alternatives, modifications and equivalents as may be included within their spirit and scope.

What is claimed is:

1. A method for encryption in an optical transport network (OTN), comprising:
provisioning an optical path between a first port at a first transponder and a second port at a second transponder in the optical transport network;
generating, at the first transponder, a first plurality of encryption keys, each encryption key utilized by the first transponder in encrypting a data payload in one or more OTN frames transmitted from the first transponder to the second transponder;
storing the first plurality of encryption keys locally on the first transponder and on the second transponder, each of the first plurality of encryption keys being stored in association with a respective identifier of the encryption key;
sharing the first plurality of encryption keys with the second transponder; and
at the first transponder:
selecting, randomly, a first one of the first plurality of encryption keys utilized by the first transponder in encrypting a data payload in a first encrypted OTN frame;
setting first overhead encryption bits in a final unencrypted OTN frame to transmit prior to transmission of the first encrypted OTN frame to indicate that the next OTN frame to be transmitted by the first transponder is an encrypted OTN frame, the overhead encryption bits including an encoding representing the respective identifier of the first randomly selected encryption key;
transmitting the final unencrypted OTN frame to the second transponder, the data payload of the final unencrypted OTN frame being unencrypted; and
transmitting the first encrypted OTN frame to the second transponder as the next OTN frame subsequent to transmitting the final unencrypted OTN frame, the data payload of the first encrypted OTN frame encrypted by the first transponder using the first randomly selected encryption key.

2. The method of claim 1, further comprising, at the first transponder:
selecting, randomly, a second one of the first plurality of encryption keys utilized by the first transponder in encrypting a data payload in a second encrypted OTN frame;
setting second overhead encryption bits in a final OTN frame whose data payload is encrypted using the first randomly selected encryption key to indicate that the next OTN frame to be transmitted by the first transponder is an encrypted OTN frame, the second overhead encryption bits including an encoding representing the respective identifier of the second randomly selected encryption key;
transmitting the final OTN frame whose data payload is encrypted using the first randomly selected encryption key to the second transponder; and
transmitting the second encrypted OTN frame to the second transponder as the next OTN frame, the data payload of the second encrypted OTN frame encrypted by the first transponder using the second randomly selected encryption key.

3. The method of claim 2, wherein the final OTN frame whose data payload is encrypted using the first randomly selected encryption key is the first OTN frame.

4. The method of claim 1, further comprising, at the second transponder:

receiving the final unencrypted OTN frame from the first transponder, including the first overhead encryption bits;

determining, based on the first overhead encryption bits, that the next OTN frame to be transmitted by the first transponder is an encrypted OTN frame;

determining, based on the first overhead encryption bits, the respective identifier of the first randomly selected encryption key;

receiving the first encrypted OTN frame from the first transponder; and decrypting the data payload of the first encrypted OTN frame using the first randomly selected encryption key.

5. The method of claim 4, further comprising, at the second transponder:

receiving a final OTN frame whose data payload is encrypted using the first randomly selected encryption key from the first transponder, including second overhead encryption bits;

determining, based on the second overhead encryption bits, that the next OTN frame to be transmitted by the first transponder is an encrypted OTN frame;

determining, based on the second overhead encryption bits, the respective identifier of a second randomly selected encryption key;

receiving the second encrypted OTN frame from the first transponder; and decrypting the data payload of the second encrypted OTN frame using the second randomly selected encryption key.

6. The method of claim 1, further comprising, at the second transponder:

selecting, randomly, a second one of the first plurality of encryption keys utilized by the second transponder in encrypting a data payload in a second encrypted OTN frame, the second randomly selected encryption key being different from the first randomly selected encryption key;

setting second overhead encryption bits in a given OTN frame to transmit by the second transponder prior to transmission of the second encrypted OTN frame to indicate that the next OTN frame to be transmitted by the second transponder is an encrypted OTN frame, the overhead encryption bits including an encoding representing the respective identifier of the second randomly selected encryption key;

transmitting the given OTN frame to the first transponder; and transmitting the second encrypted OTN frame to the first transponder as the next OTN frame subsequent to transmitting the given OTN frame, the data payload of the second encrypted OTN frame encrypted by the second transponder using the second randomly selected encryption key.

7. The method of claim 1, further comprising:

receiving, at the first transponder, prior to generating the first plurality of encryption keys, instructions to activate encryption for OTN frames transmitted from the first transponder to the second transponder;

receiving, at the first transponder, subsequent to receiving the instructions to activate encryption for OTN frames transmitted from the first transponder to the second transponder, instructions to cease encrypting OTN frames transmitted from the first transponder to the second transponder; and at the first transponder, in response to receiving the instructions to cease encrypting OTN frames:

setting second overhead encryption bits in a final OTN frame whose data payload is encrypted using the first randomly selected encryption key to indicate that the next OTN frame to be transmitted by the first transponder is a new unencrypted OTN frame;

transmitting the final OTN frame whose data payload is encrypted using the first randomly selected encryption key to the second transponder; and transmitting the new unencrypted OTN frame to the second transponder, the data payload of which is unencrypted.

8. The method of claim 1, further comprising:

determining that a trigger condition for replacing the first plurality of encryption keys with a new plurality of encryption keys has been met;

generating, at the first transponder in response to determining that the trigger condition has been met, a second plurality of encryption keys, each encryption key utilized by the first transponder in encrypting a data payload in one or more OTN frames transmitted from the first transponder to the second transponder;

storing the second plurality of encryption keys locally on the first transponder and on the second transponder, each of the second plurality of encryption keys being stored in association with a respective identifier of the encryption key; and at the first transponder:

selecting, randomly, one of the second plurality of encryption keys utilized by the first transponder in encrypting a data payload in a second encrypted OTN frame;

setting second overhead encryption bits in a given OTN frame to transmit prior to transmission of the second encrypted OTN frame to indicate that the next OTN frame to be transmitted by the first transponder is an encrypted OTN frame, the overhead encryption bits including an encoding representing the respective identifier of the randomly selected one of the second plurality of encryption keys;

transmitting the given OTN frame to the second transponder; and transmitting the second encrypted OTN frame to the second transponder as the next OTN frame subsequent to transmitting the given OTN frame, the data payload of the second encrypted OTN frame encrypted by the first transponder using the randomly selected one of the second plurality of encryption keys.

9. The method of claim 1, wherein:

the method further comprises, prior to generating the first plurality of encryption keys:

establishing a communication channel between the first transponder and the second transponder; and establishing, using the communication channel, a Transport Layer Security (TLS) connection over the OTN between the first transponder and the second transponder; and generating the first plurality of encryption keys comprises using the TLS connection in generating the first plurality of encryption keys and in sharing the first plurality of encryption keys with the second transponder.

10. The method of claim 1, further comprising, prior to generating the first plurality of encryption keys, determining, based on input received from a user, the number of keys in the first plurality of keys.

11. An optical transport network (OTN), comprising:
a first transponder;
a second transponder; and
an optical path provisioned between a first port at the first transponder and a second port at the second transponder;
wherein the first transponder is configured to:
generate a first plurality of encryption keys, each encryption key utilized by the first transponder in encrypting a data payload in one or more OTN frames transmitted from the first transponder to the second transponder;
share the first plurality of encryption keys with the second transponder;
store the first plurality of encryption keys locally on the first transponder and on the second transponder, each of the first plurality of encryption keys being stored in association with a respective identifier of the encryption key;
select, randomly, a first one of the first plurality of encryption keys utilized by the first transponder in encrypting a data payload in a first encrypted OTN frame;
set first overhead encryption bits in a final unencrypted OTN frame to transmit prior to transmission of the first encrypted OTN frame to indicate that the next OTN frame to be transmitted by the first transponder is an encrypted OTN frame, the overhead encryption bits including an encoding representing the respective identifier of the first randomly selected encryption key;
transmit the final unencrypted OTN frame to the second transponder, the data payload of the final unencrypted OTN frame being unencrypted; and
transmit the first encrypted OTN frame to the second transponder as the next OTN frame subsequent to transmitting the final unencrypted OTN frame, the data payload of the first encrypted OTN frame encrypted by the first transponder using the first randomly selected encryption key.

12. The optical transport network of claim 11, wherein the first transponder is further configured to:
select, randomly, a second one of the first plurality of encryption keys utilized by the first transponder in encrypting a data payload in a second encrypted OTN frame;
set second overhead encryption bits in a final OTN frame whose data payload is encrypted using the first randomly selected encryption key to indicate that the next OTN frame to be transmitted by the first transponder is an encrypted OTN frame, the second overhead encryption bits including an encoding representing the respective identifier of the second randomly selected encryption key;
transmit the final OTN frame whose data payload is encrypted using the first randomly selected encryption key to the second transponder; and
transmit the second encrypted OTN frame to the second transponder as the next OTN frame, the data payload of the second encrypted OTN frame encrypted by the first transponder using the second randomly selected encryption key.

13. The optical transport network of claim 11, wherein the second transponder is configured to:
store the first plurality of encryption keys locally on the second transponder, each of the first plurality of encryption keys being stored in association with a respective identifier of the encryption key;
receive the final unencrypted OTN frame from the first transponder, including the first overhead encryption bits;
determine, based on the first overhead encryption bits, that the next OTN frame to be transmitted by the first transponder is an encrypted OTN frame;
determine, based on the first overhead encryption bits, the respective identifier of the first randomly selected encryption key;
receive the first encrypted OTN frame from the first transponder; and
decrypt the data payload of the first encrypted OTN frame using the first randomly selected encryption key.

14. The optical transport network of claim 13, wherein the second transponder is further configured to:
receive a final OTN frame whose data payload is encrypted using the first randomly selected encryption key from the first transponder, including second overhead encryption bits;
determine, based on the second overhead encryption bits, that the next OTN frame to be transmitted by the first transponder is an encrypted OTN frame;
determine, based on the second overhead encryption bits, the respective identifier of a second randomly selected encryption key;
receive the second encrypted OTN frame from the first transponder; and
decrypt the data payload of the second encrypted OTN frame using the second randomly selected encryption key.

15. The optical transport network of claim 11, wherein the second transponder is configured to:
select, randomly, a second one of the first plurality of encryption keys utilized by the second transponder in encrypting a data payload in a second encrypted OTN frame, the second randomly selected encryption key being different from the first randomly selected encryption key;
set second overhead encryption bits in a given OTN frame to transmit by the second transponder prior to transmission of the second encrypted OTN frame to indicate that the next OTN frame to be transmitted by the second transponder is an encrypted OTN frame, the overhead encryption bits including an encoding representing the respective identifier of the second randomly selected encryption key;
transmit the given OTN frame to the first transponder; and
transmit the second encrypted OTN frame to the first transponder as the next OTN frame subsequent to transmitting the given OTN frame, the data payload of the second encrypted OTN frame encrypted by the second transponder using the second randomly selected encryption key.

16. The optical transport network of claim 11, wherein the first transponder is further configured to:
receive, prior to generating the first plurality of encryption keys, instructions to activate encryption for OTN frames transmitted from the first transponder to the second transponder;
receive, subsequent to receiving the instructions to activate encryption for OTN frames transmitted from the first transponder to the second transponder, instructions to cease encrypting OTN frames transmitted from the first transponder to the second transponder; and
in response to receiving the instructions to cease encrypting OTN frames:

set second overhead encryption bits in a final OTN frame whose data payload is encrypted using the first randomly selected encryption key to indicate that the next OTN frame to be transmitted by the first transponder is a new unencrypted OTN frame;

transmit the final OTN frame whose data payload is encrypted using the first randomly selected encryption key to the second transponder; and transmit the new unencrypted OTN frame to the second transponder, the data payload of which is unencrypted.

17. The optical transport network of claim 11, wherein the first transponder is further configured to:

determine that a trigger condition for replacing the first plurality of encryption keys with a new plurality of encryption keys has been met;

generate, in response to the determination that the trigger condition has been met, a second plurality of encryption keys, each encryption key utilized by the first transponder in encrypting a data payload in one or more OTN frames transmitted from the first transponder to the second transponder;

store the second plurality of encryption keys locally on the first transponder, each of the second plurality of encryption keys being stored in association with a respective identifier of the encryption key;

select, randomly, one of the second plurality of encryption keys utilized by the first transponder in encrypting a data payload in a second encrypted OTN frame;

set second overhead encryption bits in a given OTN frame to transmit by the first transponder prior to transmission of the second encrypted OTN frame to indicate that the next OTN frame to be transmitted by the first transponder is an encrypted OTN frame, the overhead encryption bits including an encoding representing the respective identifier of the randomly selected one of the second plurality of encryption keys;

transmit the given OTN frame to the second transponder; and transmit the second encrypted OTN frame to the second transponder as the next OTN frame subsequent to transmitting the given OTN frame, the data payload of the second encrypted OTN frame encrypted by the first transponder using the randomly selected one of the second plurality of encryption keys.

18. The optical transport network of claim 11, wherein the first transponder is further configured to determine, prior to generating the first plurality of encryption keys and based on input received from a user, the number of keys in the first plurality of keys.

19. The optical transport network of claim 11, wherein:

the optical transport network further comprises a communication channel from the first port to the second port over which a Transport Layer Security (TLS) connection is established between the first transponder and the second transponder; and generating the first plurality of encryption keys comprises using the TLS connection in generating the first plurality of encryption keys and to share the first plurality of encryption keys with the second transponder.

20. The optical transport network of claim 11, further comprising a network management system having a network interface, the network management system configured to:

receive, on behalf of the first transponder, user input specifying the number of keys in the first plurality of keys;

provide instructions to the first transponder to activate encryption for OTN frames transmitted from the first transponder to the second transponder; and subsequent to providing the instructions to the first transponder to activate encryption, provide instructions to the first transponder to cease encrypting OTN frames transmitted from the first transponder to the second transponder.

* * * * *